(12) United States Patent  (10) Patent No.: US 7,585,450 B2
Wahlstrom et al.  (45) Date of Patent: Sep. 8, 2009

(54) RAPID PROTOTYPING AND MANUFACTURING SYSTEM AND METHOD

(75) Inventors: Ben Wahlstrom, Albany, OR (US); Don Frederick Hunter, Corvallis, OR (US)

(73) Assignee: 3D Systems, Inc., Rock Hill, SC (US)

( * ) Notice: Subject to any disclaimer, the term of this patent is extended or adjusted under 35 U.S.C. 154(b) by 638 days.

(21) Appl. No.: 11/240,818

(22) Filed: Sep. 30, 2005

(65) Prior Publication Data
US 2007/0075458 A1   Apr. 5, 2007

(51) Int. Cl.
*B29C 35/08* (2006.01)
*B29C 41/02* (2006.01)
*B29C 41/52* (2006.01)

(52) U.S. Cl. .................................. 264/401; 264/40.1
(58) Field of Classification Search .................. 264/308, 264/401, 408, 40.1; 425/135, 174, 174.4
See application file for complete search history.

(56) References Cited

U.S. PATENT DOCUMENTS

| | | | |
|---|---|---|---|
| 4,575,330 A | 3/1986 | Hull | |
| 4,783,348 A | 11/1988 | Albrecht et al. | |
| 5,071,337 A | 12/1991 | Heller et al. | |
| 5,096,530 A | 3/1992 | Cohen | |
| 5,174,931 A | 12/1992 | Almquist et al. | |
| 5,236,637 A | 8/1993 | Hull | |
| 5,248,249 A | 9/1993 | Yamamoto et al. | |
| 5,258,146 A | 11/1993 | Almquist et al. | |
| 5,358,673 A | 10/1994 | Heller et al. | |
| 5,369,431 A | 11/1994 | Levy et al. | |
| 5,569,431 A | 10/1996 | Hull | |
| 5,571,471 A | 11/1996 | Hull | |
| 5,573,722 A | 11/1996 | Hull | |
| 5,626,919 A | 5/1997 | Chapman et al. | |
| 5,651,934 A | 7/1997 | Almquist et al. | |
| 5,688,464 A | 11/1997 | Jacobs et al. | |
| 5,693,144 A | 12/1997 | Jacobs et al. | |
| 5,780,070 A * | 7/1998 | Yamazawa et al. | ....... 425/174.4 |

(Continued)

FOREIGN PATENT DOCUMENTS

EP   0376571   7/1990

(Continued)

OTHER PUBLICATIONS

European Search Report for Application No. EP06018481.9; Date of Completion Apr. 12, 2007.

(Continued)

*Primary Examiner*—Leo B Tentoni
(74) *Attorney, Agent, or Firm*—Ralph D'Alessandro; Keith A. Roberson

(57) ABSTRACT

A stereolithography apparatus having a resin vat with resupply containers in one-way flow communication and a leveling container in two-way flow communication, an automatic off-load cart to remove and replace build support platforms, an elevator assembly for supporting and releasably retaining a build platform removably attached to the stereolithography apparatus frame such that elevator forks supporting the build platform can be released into the vat and removed from the stereolithography apparatus with the vat, and a recoater assembly and recoater blade for mapping the resin surface in the vat and applying a fresh coating of resin to a cross-section being built in the vat.

20 Claims, 29 Drawing Sheets

U.S. PATENT DOCUMENTS

| | | | |
|---|---|---|---|
| 5,885,511 A | 3/1999 | Heller et al. | |
| 5,891,382 A * | 4/1999 | Almquist et al. | 264/401 |
| 5,902,537 A | 5/1999 | Almquist et al. | |
| 5,904,889 A | 5/1999 | Serbin et al. | |
| 5,922,364 A | 7/1999 | Young, Jr. | |
| 5,972,563 A | 10/1999 | Steinmann et al. | |
| 6,048,487 A | 4/2000 | Almquist et al. | |
| 6,110,409 A * | 8/2000 | Allanic et al. | 264/401 |
| 6,157,663 A | 12/2000 | Wu et al. | |
| 6,174,156 B1 | 1/2001 | Chapman et al. | |
| 6,340,297 B1 | 1/2002 | Chapman et al. | |
| 6,733,267 B2 | 5/2004 | Chapman et al. | |
| 2004/0026418 A1 | 2/2004 | Ederer et al. | |
| 2004/0035542 A1 | 2/2004 | Ederer et al. | |
| 2006/0022379 A1 | 2/2006 | Wicker et al. | |
| 2006/0078638 A1 | 4/2006 | Holmboe et al. | |
| 2006/0219671 A1 | 10/2006 | Merot et al. | |
| 2007/0074659 A1 | 4/2007 | Wahlstrom | |
| 2007/0075458 A1 | 4/2007 | Wahlstrom et al. | |
| 2007/0075459 A1 | 4/2007 | Reynolds et al. | |
| 2007/0075460 A1 | 4/2007 | Wahlstrom et al. | |
| 2007/0075461 A1 | 4/2007 | Hunter et al. | |
| 2007/0077323 A1 | 4/2007 | Stonesmith et al. | |

FOREIGN PATENT DOCUMENTS

| | | |
|---|---|---|
| EP | 1645402 | 4/2006 |
| EP | 1707341 | 10/2006 |
| GB | 2315699 | 2/1998 |
| JP | 55-146015 | 11/1980 |
| JP | 6-226864 | 8/1994 |
| JP | 8-156105 | 6/1996 |
| JP | 3441203 | 6/1996 |
| JP | 8-338753 | 12/1996 |
| JP | 2912721 | 6/1999 |
| JP | 11-342541 | 12/1999 |
| JP | 3140741 | 12/2000 |
| WO | 93/25377 | 12/1993 |
| WO | WO 01/14125 | 3/2001 |
| WO | WO0226420 | 4/2002 |
| WO | WO0226478 | 4/2002 |
| WO | WO 2004/014636 | 2/2004 |

OTHER PUBLICATIONS

Office Action mailed Dec. 19, 2007, in U.S. Appl. No. 11/240,822.

* cited by examiner

RAPID PROTOTYPING AND MANUFACTURING SYSTEM AND METHOD

BACKGROUND OF THE INVENTION

This invention relates to methods and apparatus for rapid prototyping and manufacturing ("RP&M") to produce three-dimensional objects, and more particularly to improving the productivity and efficiency of RP&M systems.

RP&M is the name given to a field of technologies that can be used to form three-dimensional objects or solid images. In general, RP&M techniques build three-dimensional objects, layer-by-layer, from a building medium using data representing successive cross-sections of the object to be formed. Computer Aided Design and Computer Aided Manufacturing systems, often referred to as CAD/CAM systems, typically provide the object representation to an RP&M system. The three primary modes of RP&M include stereolithography, laser sintering, and ink jet printing of solid images.

Laser sintering builds solid images from thin layers of heat-fusible powders, including ceramics, polymers, and polymer-coated metals to which sufficient energy is imparted to solidify the layers. Ink jet printing builds solid images from powders that are solidified when combined with a binder. Stereolithography, to which the subject matter herein is primarily addressed, builds solid images from thin layers of polymerizable liquid, commonly referred to as resin.

Stereolithography and laser sintering systems typically supply the energy for creating and building up the thin cross-sections of three-dimensional objects through modulation and precise directional control of lasers. The laser applies energy to a targeted area of the layer of powder or liquid building medium. The thin targeted layer is called the working surface of the building medium. Conventional RP&M laser systems position the laser beam using a scanning system having galvanometer-driven mirrors that are directed by a control computer. The mirrors deflect a laser beam in response to a CAD/CAM program that has been tessellated into the STL format and sliced into cross-sectional data files that are merged into a build file.

In stereolithography, three-dimensional objects result from successive solidification of a plurality of thin layers of a polymerizable liquid, one on top of another, until all of the thin layers join together to form the three-dimensional object. Each layer represents a thin cross-section of the desired three-dimensional object. Polymerizable liquids are generally referred to as "resins," and solidified layers of resin are said to be cured. Practical building media typically include resins that cure sufficiently fast, usually with ultraviolet light. An ultraviolet laser generates a small and intense spot of light that is moved across the liquid surface with a galvanometer mirror in an x-y scanner in a predetermined pattern. The scanner is driven by computer generated vectors or the like. This technique rapidly produces precise complex patterns.

A typical stereolithography system includes a laser scanner, a vat for containing the resin, an object support platform, which is capable of being raised and lowered in the vat, and a controlling computer. The computer controls the system automatically to make a plastic part, forming one thin cross-section of cured resin at a time on the object support platform and building the desired three-dimensional object up layer-by-layer. The object support platform supports the cured layers and rests beneath the surface of the liquid resin the distance of one layer thickness to define a working surface. The laser cures selected portions of liquid resin at the working surface to cure the next layer. The computer controls the system to recoat the surface of the cured resin with fresh resin and repeats the steps thousands of times until completing the desired object. The object or multiple objects being built and the completed sequence of steps is sometimes referred to as a "build." An operator removes the build from the vat of resin for cleaning and further curing as needed. The liquid resin remaining in the vat remains usable so long as it is not too contaminated with suspended bits of cured resin.

One method of recoating the cured resin layers with fresh resin requires "deep dipping"the platform in the liquid resin. The platform vertically drops below the surface of the bath of resin a distance greater than the desired layer thickness to coat the cured layers with fresh liquid resin. The system raises the platform to one layer thickness beneath the resin surface. Excess liquid resin runs off to level the resin by gravity to a single layer thickness. Thereafter, the laser applies energy to the working surface.

The waiting period for the thin layer to level varies depending on several factors, including the viscosity of the polymerizable liquid, the layer thickness, part geometry, cross-section, and the like. Some recent resins level more quickly than prior resins. Leveling can be assisted by the use of a doctor blade or vacuum assisted doctor blade, sometimes referred to as a Zephyr blade, to sweep across the surface of the resin, applying fresh resin and removing the excess much more quickly than by gravity settling and leveling the working resin surface in the vat containing the resin. The blade is said to recoat the solidified layers and is often referred to as a "recoater."

Various improvements have been proposed to increase the efficiency with which RP&M techniques are accomplished, including improvements to laser systems for more efficient use of the laser and for more precise imaging, improvements to building media, reduction of curing time, control of resin level in the vat, and the like. It would be desirable to make additional improvements that enable stereolithography systems to produce more objects in less time, and to do so with greater precision and less human intervention.

SUMMARY

This invention provides several improvements to rapid prototyping and manufacturing systems that enable an unattended building of a three-dimensional object. Two three-dimensional objects can be built in sequence, one after the other, from the same location in a single building medium, without requiring a human operator present after building the first object starts. The system does not require an operator to attend the completion of the first build and its removal from the building medium, the start of the second build, or the completion of the second build. While the system can be used for a single build, the system allows the return of an operator to a system having two objects built in sequence and awaiting unloading, cleaning, and further curing as needed.

The system of the invention can be applied to multiple chamber units having a single energy source so that more than one build can be completed at a time, each followed by a second unattended build. The objects completed in a single first build and those completed in a second build can be of the same or different design, and the building medium is the same for the second build as for the first. The objects completed simultaneously in adjacent chambers, which will be either the first or second build in an unattended build sequence, will usually be prepared from the same building medium, but need not be so long as the appropriate machine and process adjustments are made to enable curing.

In more specific detail of an embodiment of the invention, the invention provides apparatus and methods for stereolithography that include a housing having an elevator for supporting, raising, and lowering a support platform for an object to be built, a vat for containing a liquid resin from which an object is built, a source of energy for solidifying selected laminae of the liquid resin, a cart for unattendedly removing a first build from the elevator, and control systems for controlling the elevator, the energy source, the cart, and the resin level in the vat.

In a more specific embodiment, the elevator component includes an elevator attachment bracket for attachment to an elevator drive plate in the stereolithography housing. The attachment bracket has hooks for releasably engaging attachment to a support rod on the elevator drive plate and a receiver for receiving a centering pin on the elevator drive plate that locates the attachment bracket precisely in alignment with the horizontal x, y plane of the working surface of the resin.

The attachment bracket is fixedly supported on an elevator frame that extends vertically so as to be readily lowered into the resin vat and raised out of the vat. The elevator frame also extends generally horizontally for providing a pair of elevator forks to support and secure an object support platform. The object support platform is supported by the forks, and by arms extending horizontally outwardly from each side of the rear of the forks. The platform is secured to the forks by releasably engaging latch members at the front of the forks. The latch members are actuated by a spring-biased latch linkage. The latch linkage is operable to engage a ramp on the elevator support when the elevator is raised sufficiently high above the resin so as to release the latch members, and thus the platform, from latching engagement.

The cart for removing a first build from the elevator can, if desired, be operated by computer control to install a fresh object support platform on the elevator. The support platform can be lowered into the vat for a second, unattended build. After the build is completed, the elevator rises to remove the completed three-dimensional object or objects in the build and the platform from the resin to drain. The cart, referred to below as an auto off-load cart, is equipped to dock precisely into the housing and with the resin vat. Telescoping arms extend on computer-controlled command to engage and remove the first build and associated support platform and can be extended to install a fresh platform for a second build, if desired.

The resin vat includes containers of supplemental resin for supplying additional liquid to the vat as needed in response to a level sensor. During a build, it is desirable to maintain a precisely controlled level of liquid in the vat. The resin level fluctuates as some of the resin is solidified and as the platform lowers the build into the resin to complete additional layers at the surface. It is also necessary to add resin to the vat between builds to maintain the level of resin sufficient for a second build.

In a specific embodiment of the invention, the vat and supplemental resin containers include tags for radio frequency identification (RFID). The resin in the supplemental container can readily be screened and identified prior to entering into the resin in the vat so as to avoid contamination of the resin in the vat by the wrong resin.

In still further embodiments, the invention includes a recoater assembly for leveling the resin that can be computer controlled for remaining parallel to the working surface across the surface of the resin. The recoater assembly includes a recoater blade and a carrier for the blade that makes adjustments in any of three directions (y, z, and theta): 1) the horizontal y-axis direction of travel of the recoater assembly across the resin surface, 2) the vertical z-axis of travel up and down, providing for blade gap between the bottom of the recoater blade and the working surface of the resin and for removal of the recoater assembly from the vat, and 3) the rotational theta axis, parallel to the y-axis, for maintaining the blade parallel to the resin surface throughout the y-axis direction of travel. The x, y plane corresponds to the working surface of the resin.

The recoater blade is kept at the same distance from the working surface of the resin throughout the length of travel of the recoater. The recoater blade travels vertically along an axis "z" and also rotates about a longitudinal axis, theta, that is parallel to and spaced from the axis "y" of travel of the recoater so that the ends of the recoater are always the same distance from the resin surface and the blade is parallel to the resin surface. This embodiment of the invention corrects for machine errors and reduces inaccuracies in the three-dimensional products. Machine errors arise from unevenness in the mechanical systems that in the past have required tedious adjustments to the recoater systems.

Computer control of the recoater is provided in response to data sets for the distance between the bottom of the recoater and working surface of the resin obtained prior to initiating laser contact with the resin surface. A sensor contained within the recoater carrier housing provides this data to the computer. The sensor is on a motion system that moves along the length of the blade (x-axis). The sensor operates above the horizontal x, y plane of the working surface of the resin at two fixed locations x, one on each side of the recoater adjacent the edge of the vat, to obtain data at multiple points y of travel of the recoater. The recoater has thinned-down feet at each end, blade gap sensing feet, to which the sensor determines the distance. The distance of the sensor to the bottom of the foot can be accurately determined since the distance to the bottom of the foot is known and can be added to the sensor determination of the distance to the top of the thinned-down portion of the foot. The sensor is displaced a slight distance x to obtain a reading of distance to the working surface of the resin. The difference between the distance to the working surface and the bottom of the recoater is calculated and this data is stored for each side of the resin vat. The computer sets the blade gap for the z axis based on empirical data for the particular resin in use. The recoater is rotated about the theta axis and is raised or lowered along the z axis to maintain a constant distance at each end from the working surface so that the blade gap remains fixed. Thus, machine and positioning errors, including errors in the tracks along which the recoater travels, can be taken into account and corrected.

The recoater does not need to be changed between builds in the unattended sequential build mode and is designed for precise positioning and easy removal and replacement by hand and without tools. The recoater is fixedly attached to the carrier at each end. Magnets may be used.

Correct orientation of the blade is confirmed in two ways. Differently shaped alignment pins are included on each end of the blade for placement in corresponding receptacles on the recoater carrier housing. Contacts are included on each end of the recoater carrier, all of which must be activated to result in a signal from a proximity switch to show the blade is correctly positioned on the carrier housing. The recoater normally is vacuum-assisted and is provided with a vacuum receptacle in the blade, a countersink for a soft fitting extending from the carrier, for which vacuum communication is established simply by correctly positioning the blade on the carrier and turning on the vacuum.

The apparatus and process of the invention can be applied to a single vat of resin or to two or more vats operated with a single laser in which one layer is solidified in selected vats while others are recoated. Typically, two vats will be lased, one after the other, and it is possible to lase more than two using appropriate scanners and beam splitters.

Thus, the invention provides for an unattended stereolithographic build from a single vat of resin after a first build has been completed. The invention includes a number of improvements to stereolithography apparatus so as to enable unattended builds and provides several features that can be subject to automated computer control to greatly simplify obtaining the precision required for accurate production of three-dimensional objects. These improvements include the automated off-load cart for removing a first build from the elevator and providing a fresh object support platform, switching the laser between vats for simultaneous builds, coupling of supplemental resin containers directly to the stereolithography system for automated determination of resin supply sufficiency to support an unattended build, RFID identification of resin containers for maintaining integrity of the resin, automated leveling of the resin working surface level during a build and automated refilling of the vat between builds, automated determination of the distance between the working surface and the recoater and the mapping of this distance over the axis of travel of the recoater for automated control of the rotation of the recoater and correction of machine errors, automated release of the object support platform from the elevator and replacement with a fresh platform, and installation and removal of the recoater blade entirely by hand and in the absence of tools.

BRIEF DESCRIPTION OF THE DRAWINGS

Figure 1:
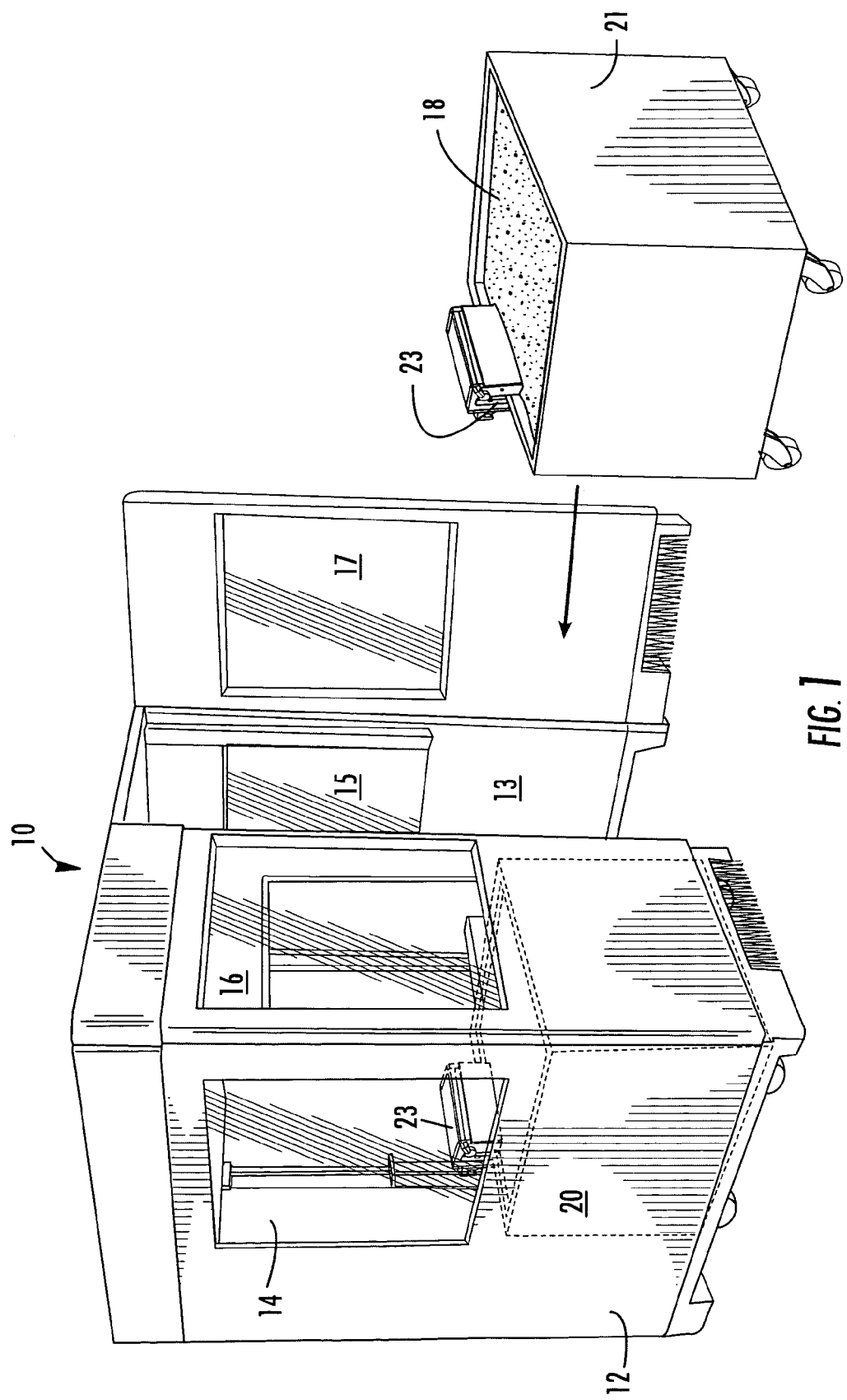
Figure 2:
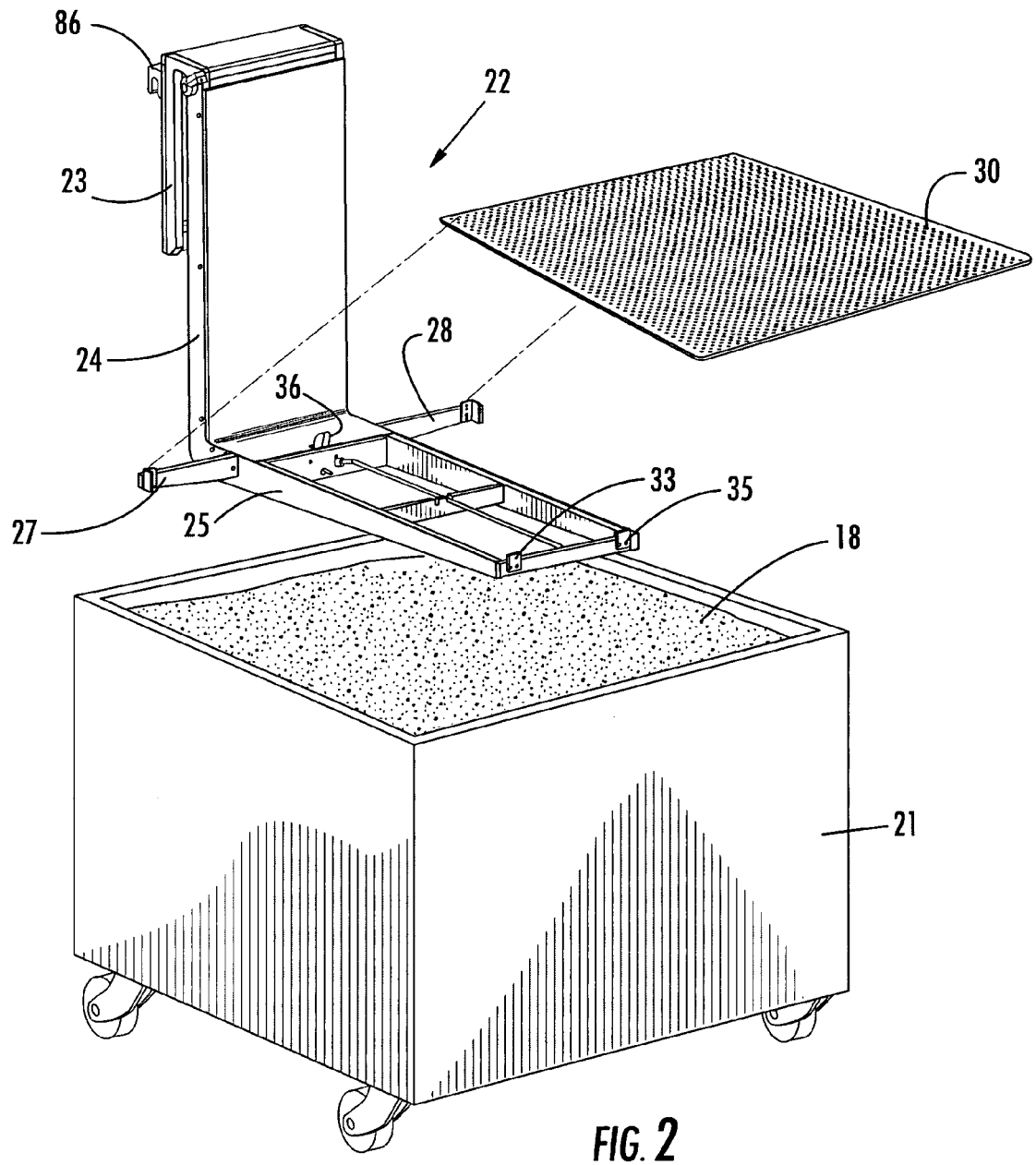
Figure 3:
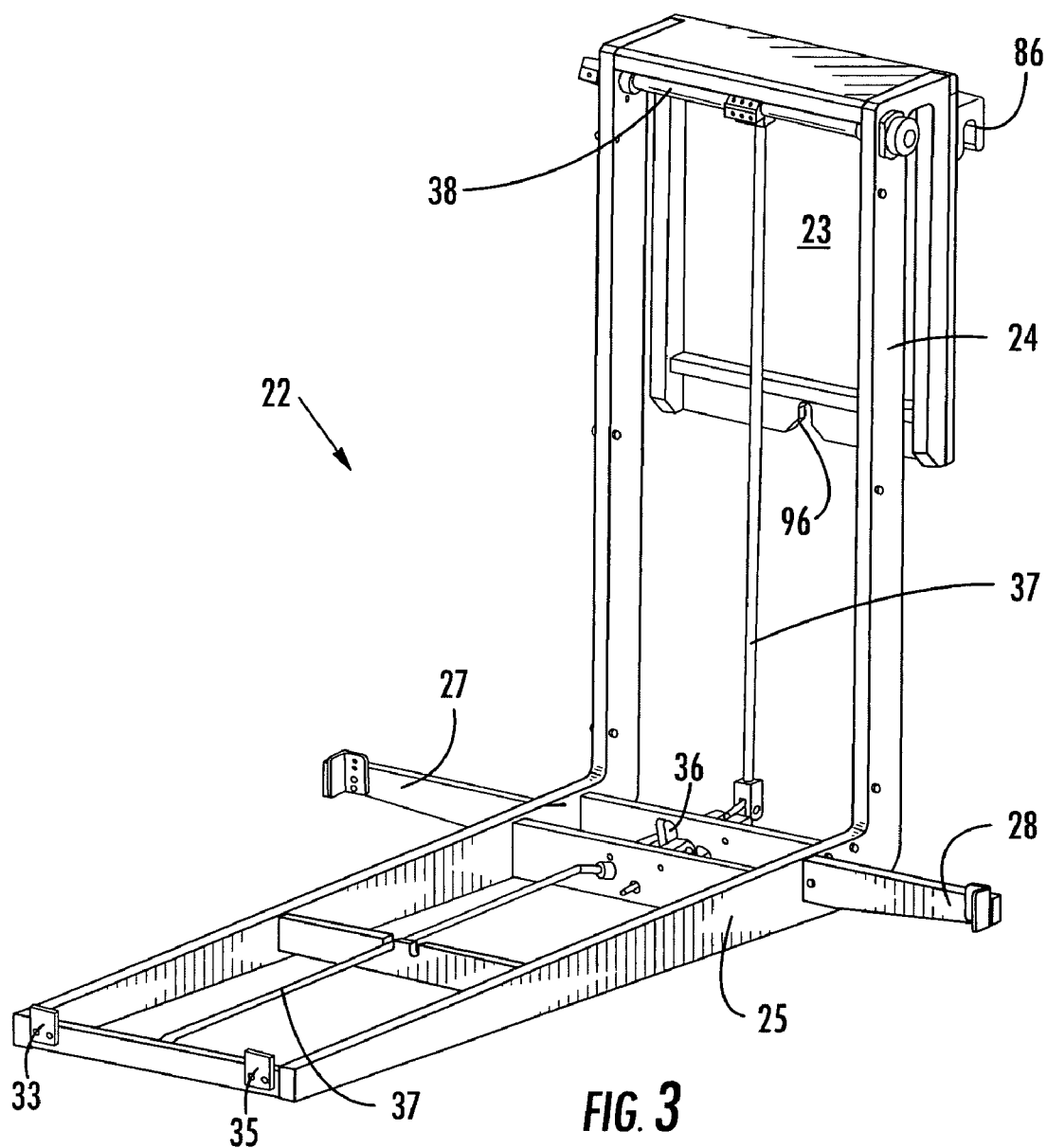
Figure 4:
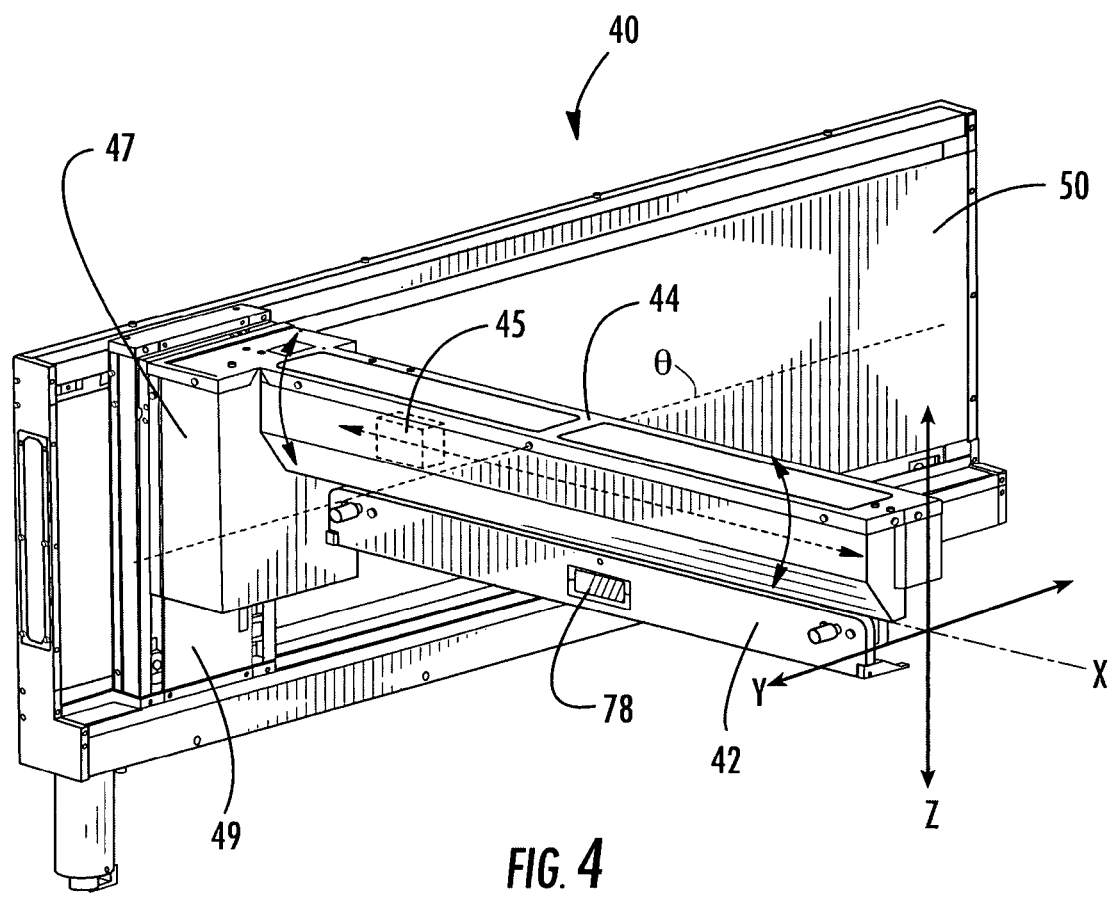
Figure 5:
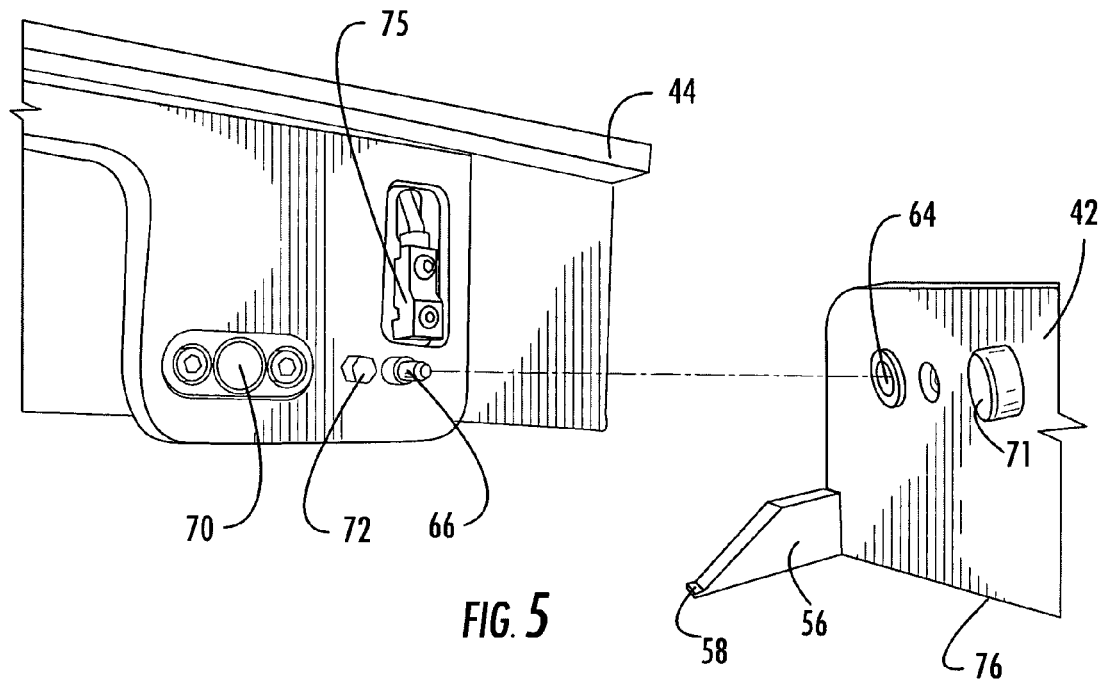
Figure 6:
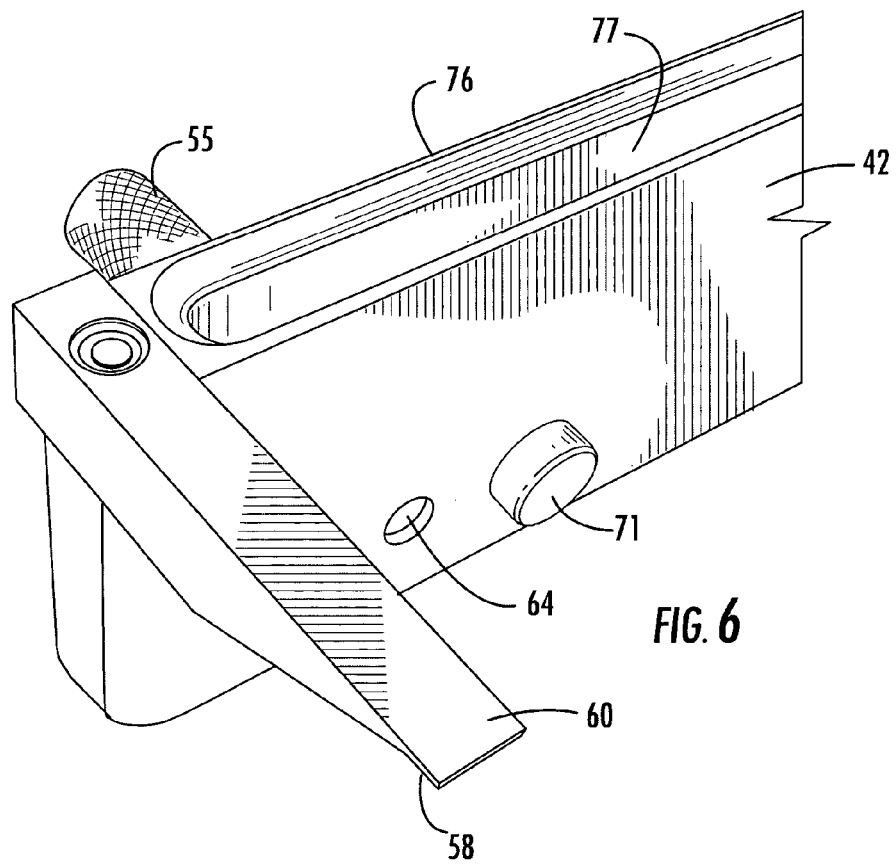
Figure 7:
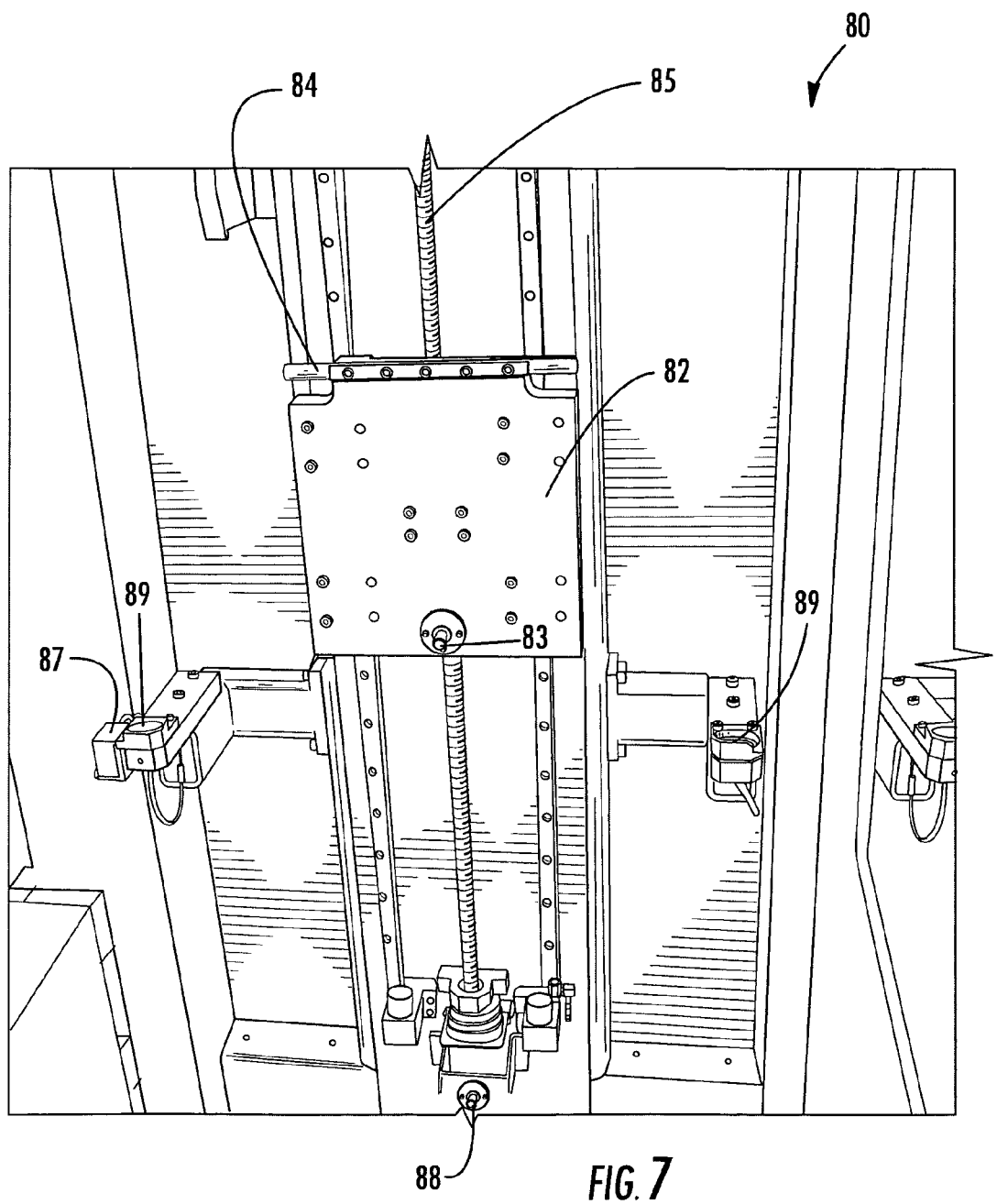
Figure 8:
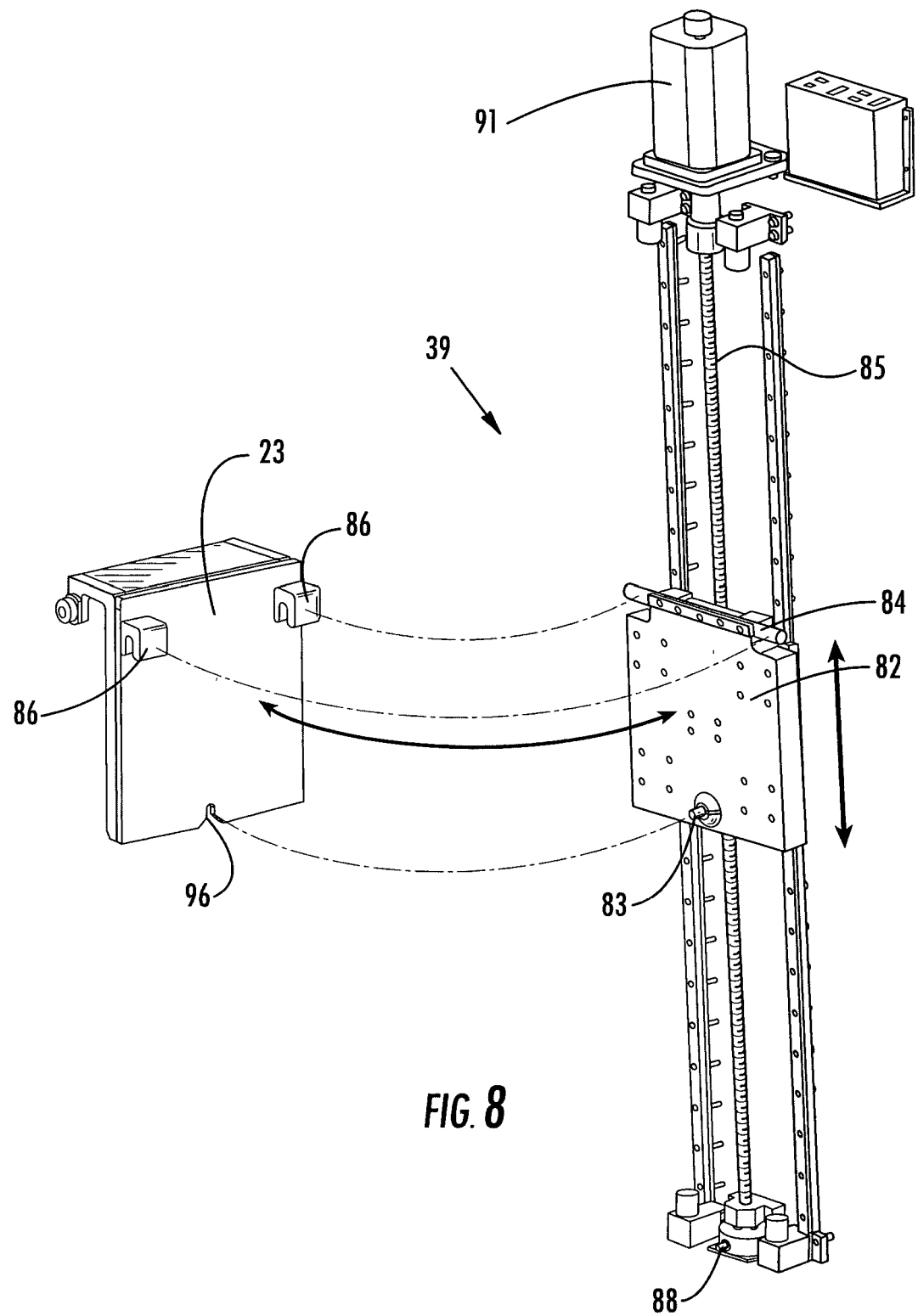
Figure 9:
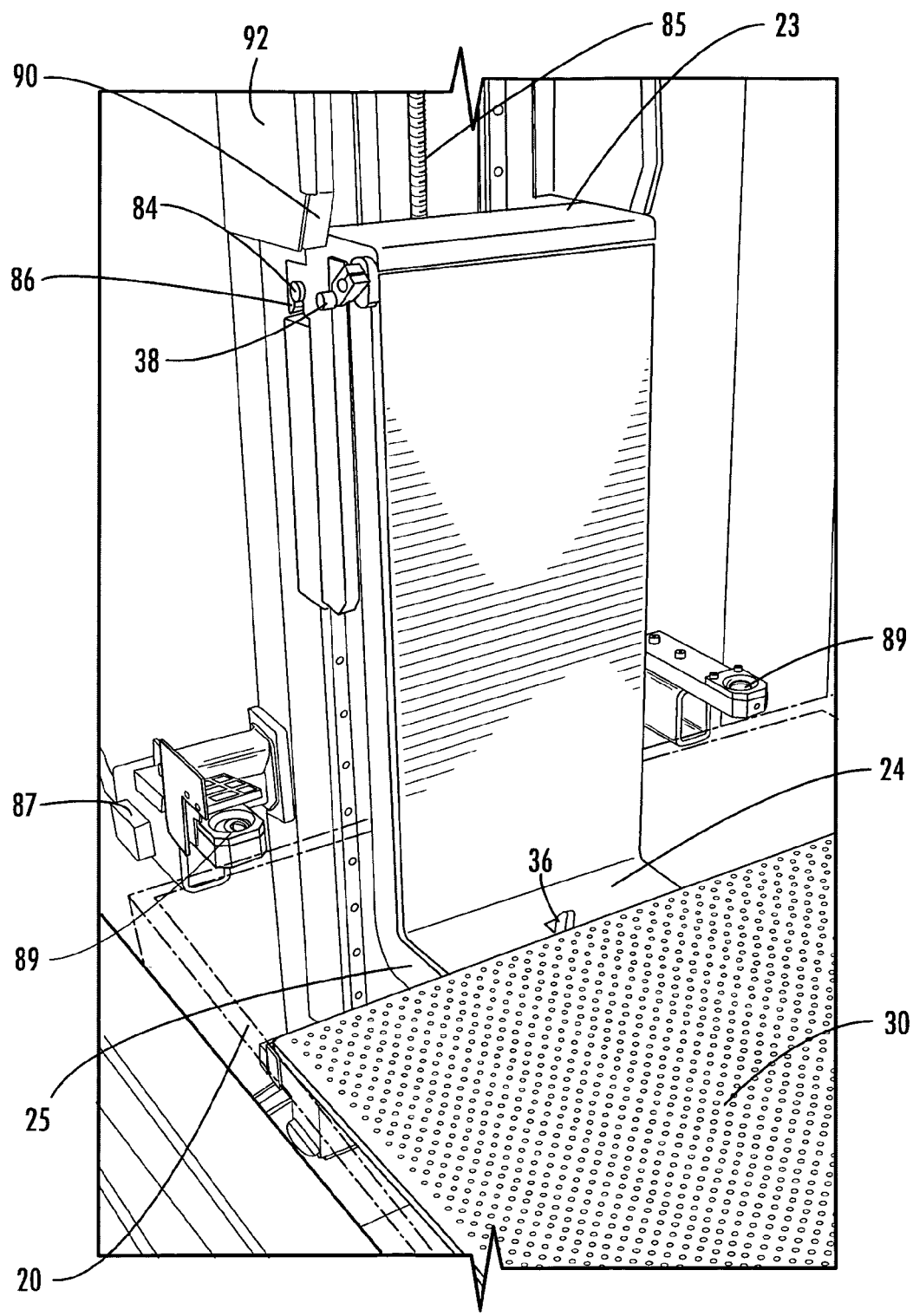
Figure 10:
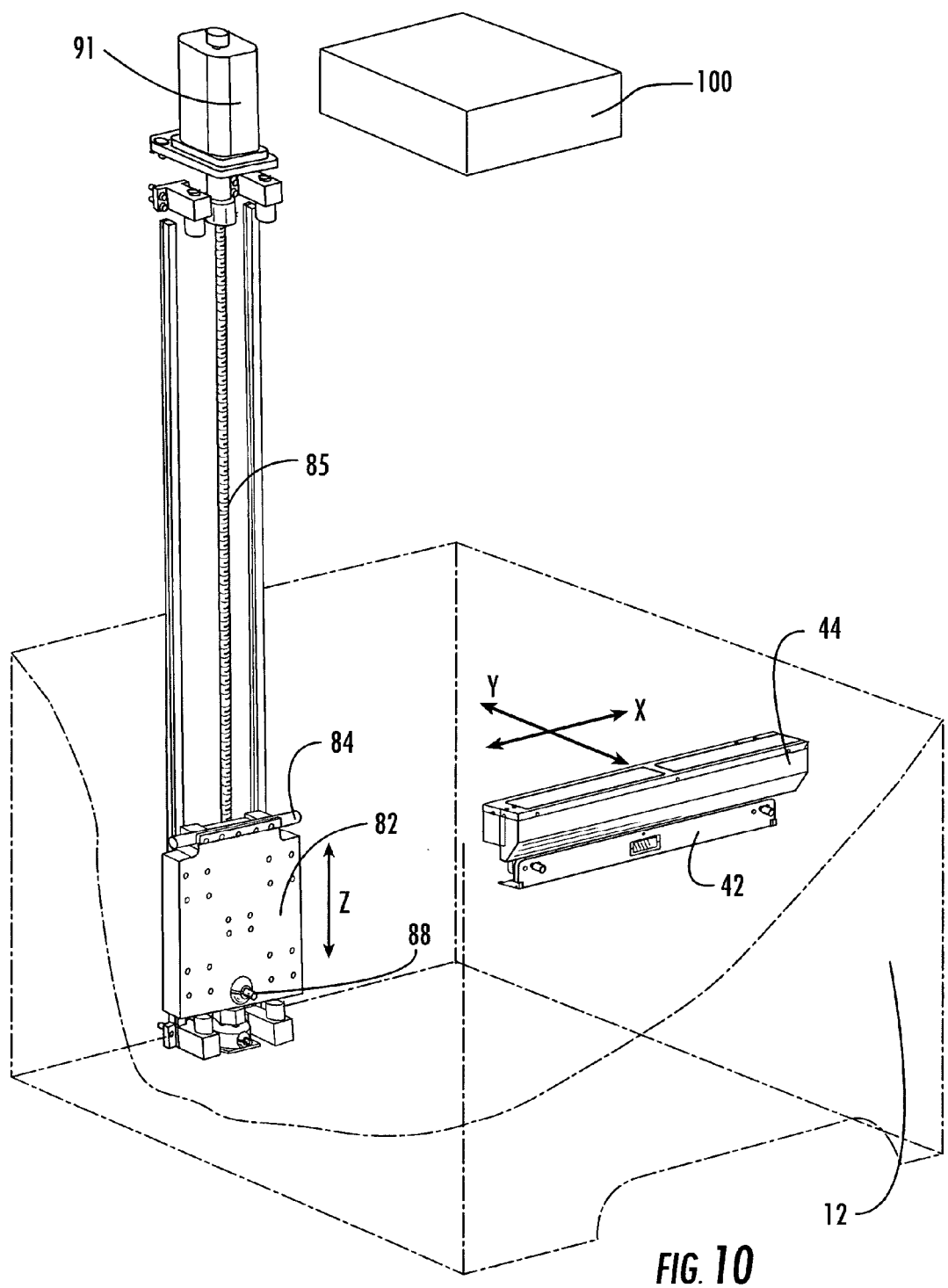
Figure 11:
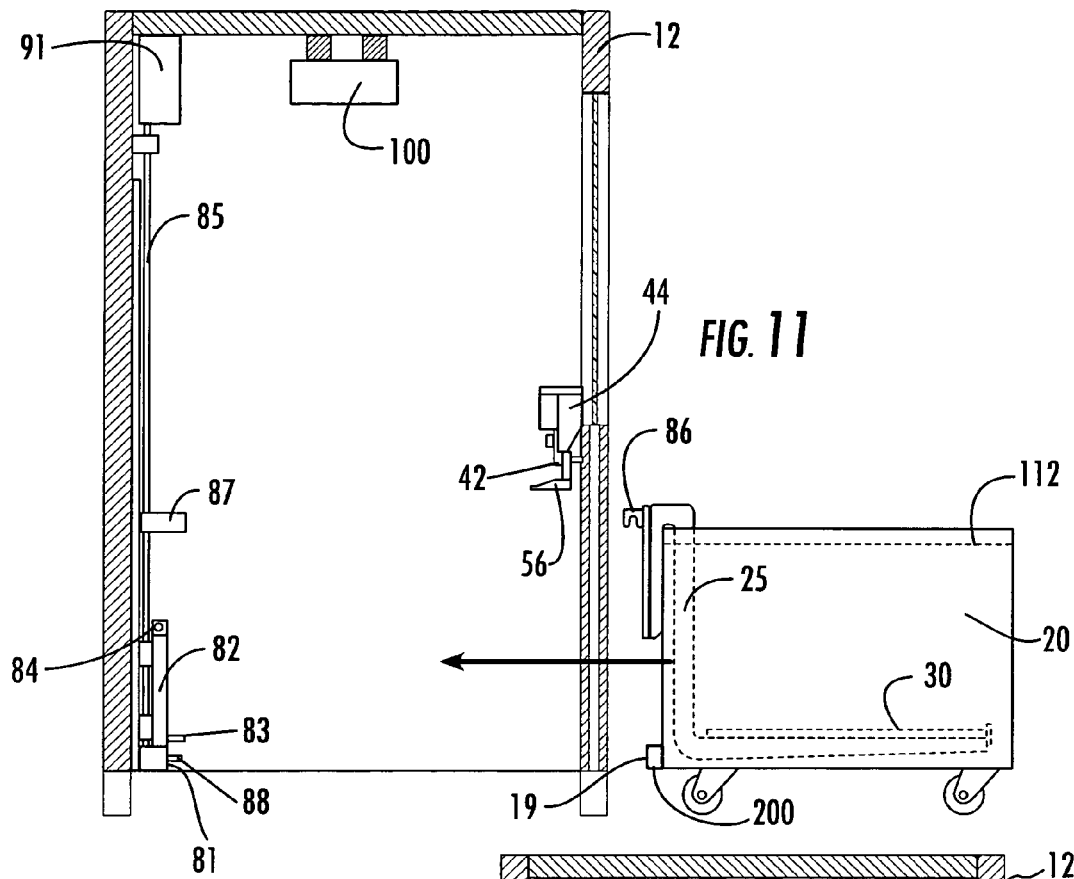
Figure 12:
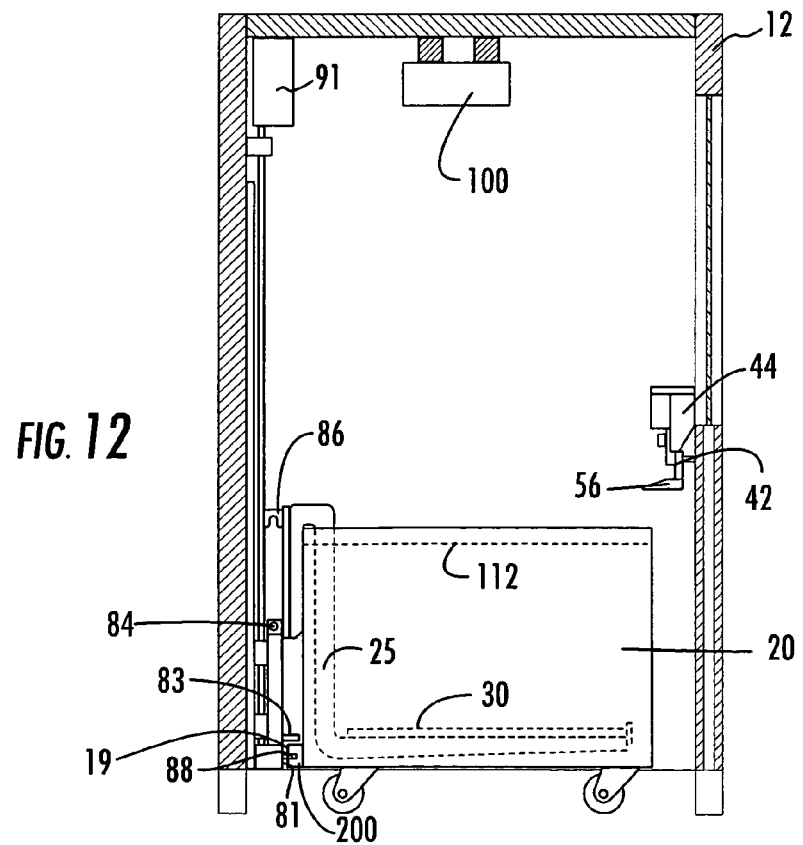
Figure 13:
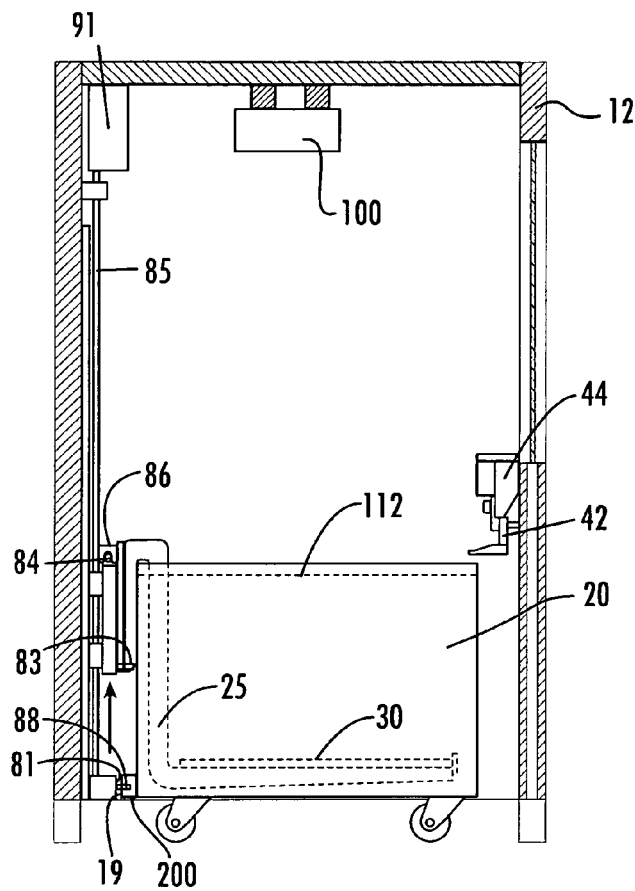
Figure 14:
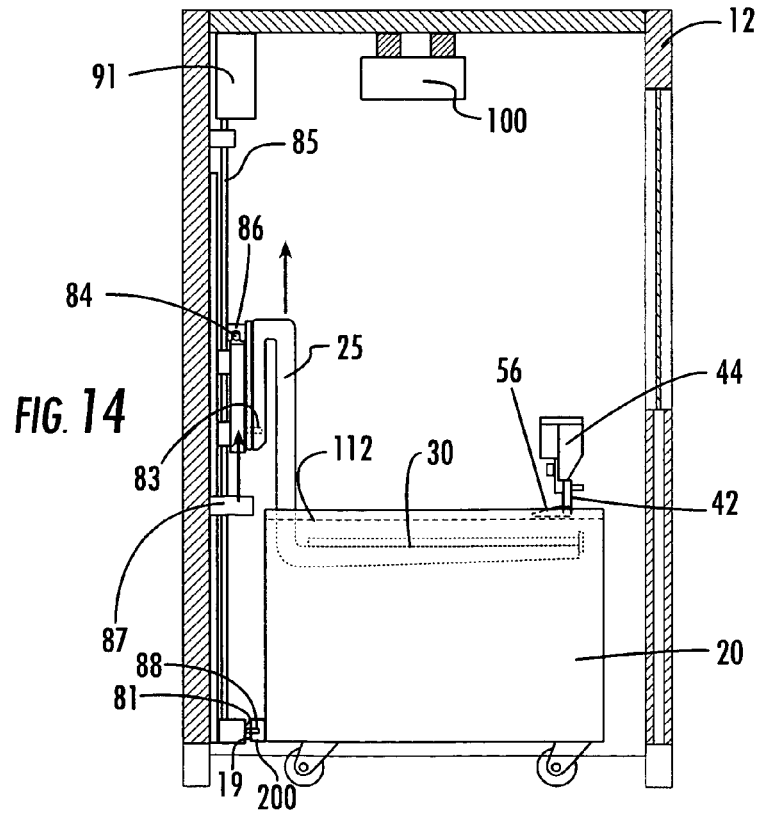
Figure 15:
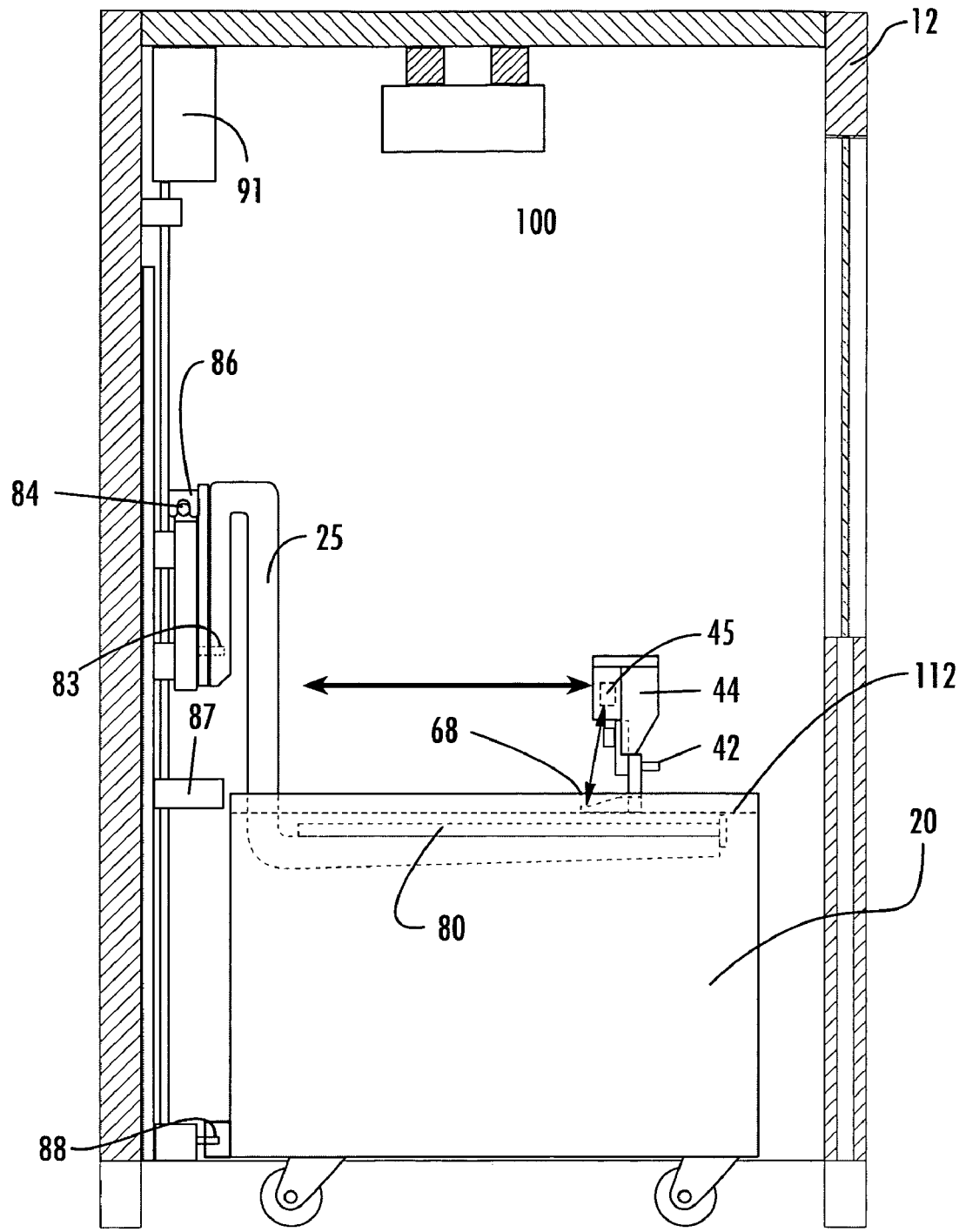
Figure 16A:
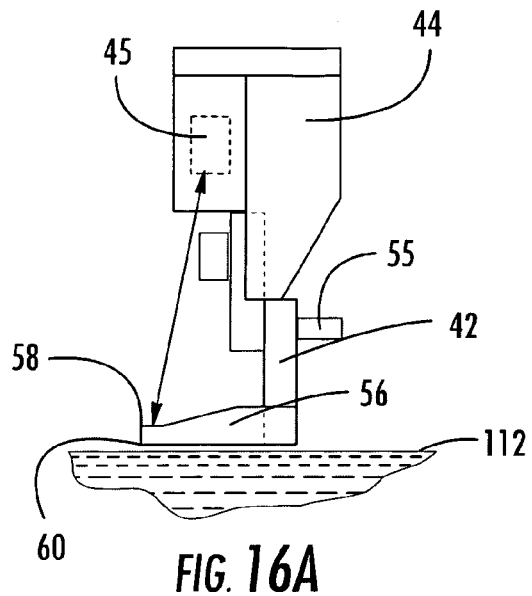
Figure 16B:
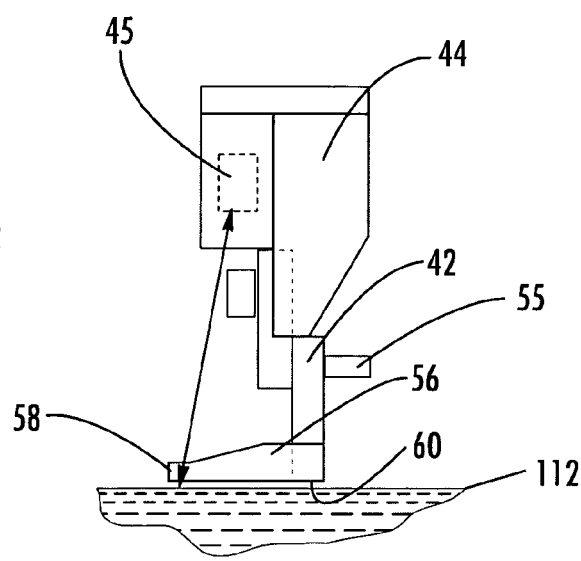
Figure 16C:
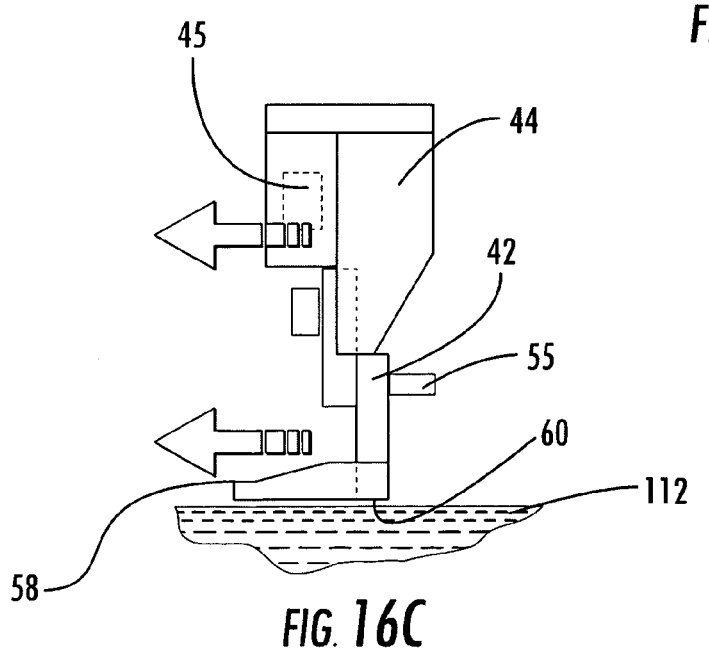
Figure 17:
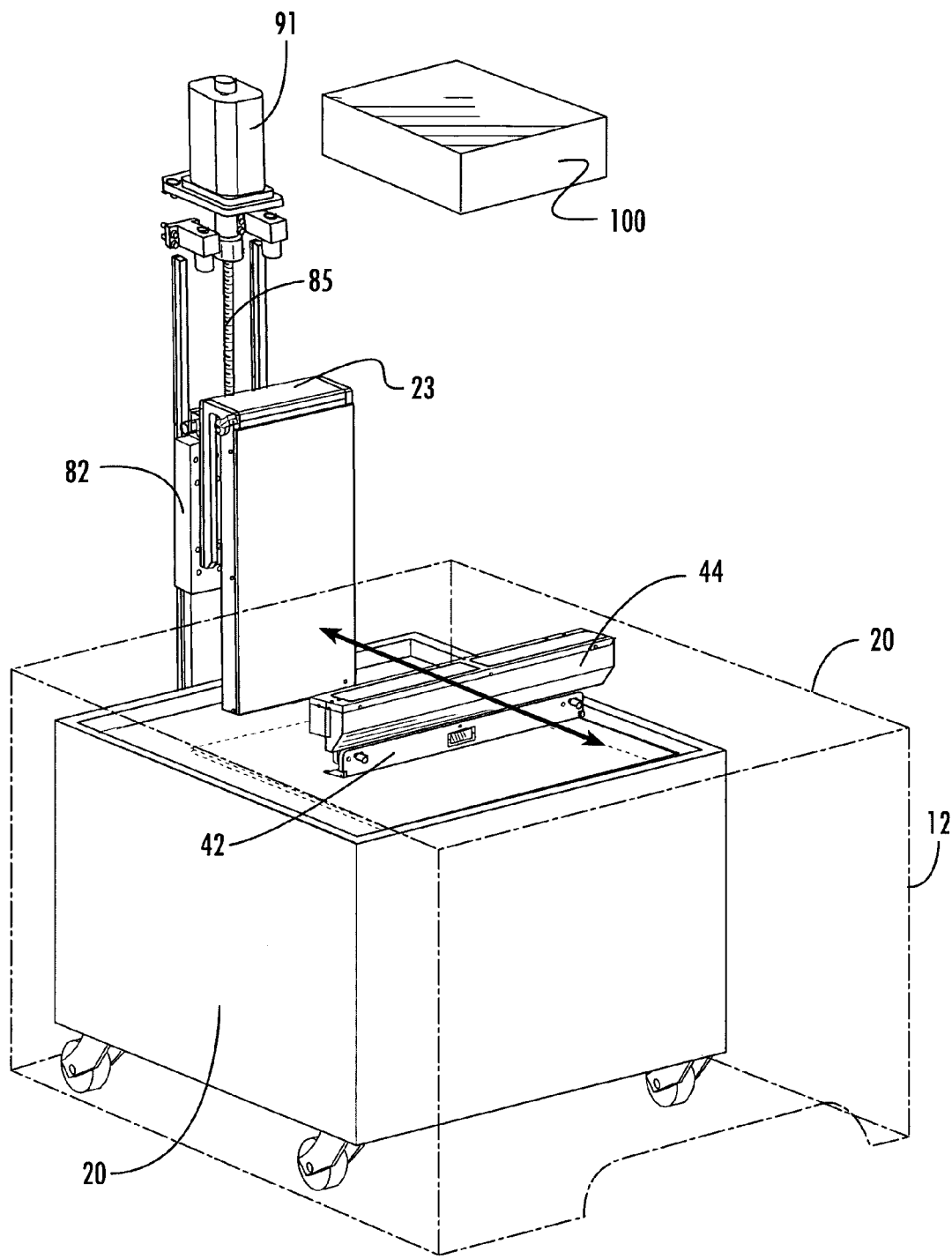
Figure 18:
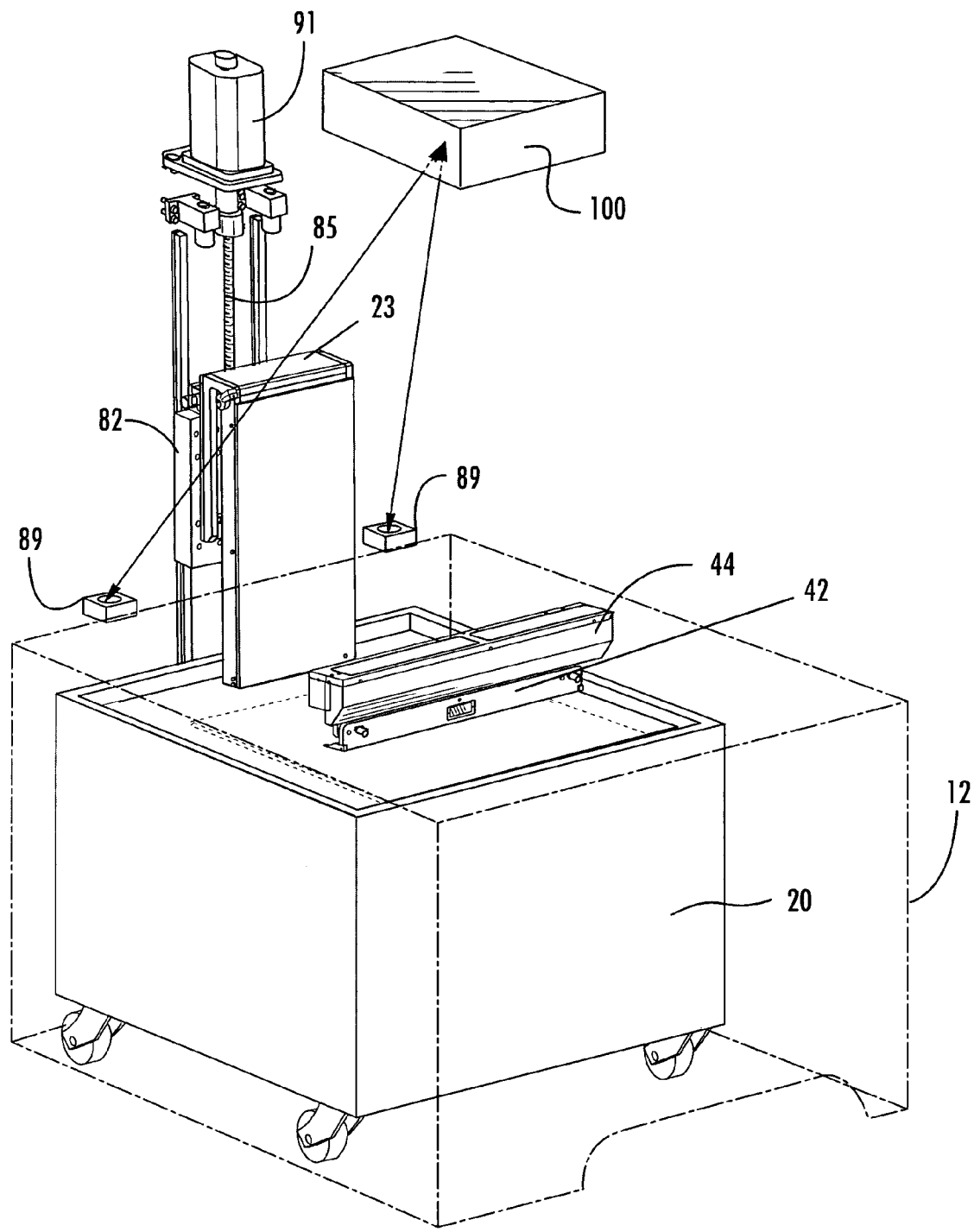
Figure 19:
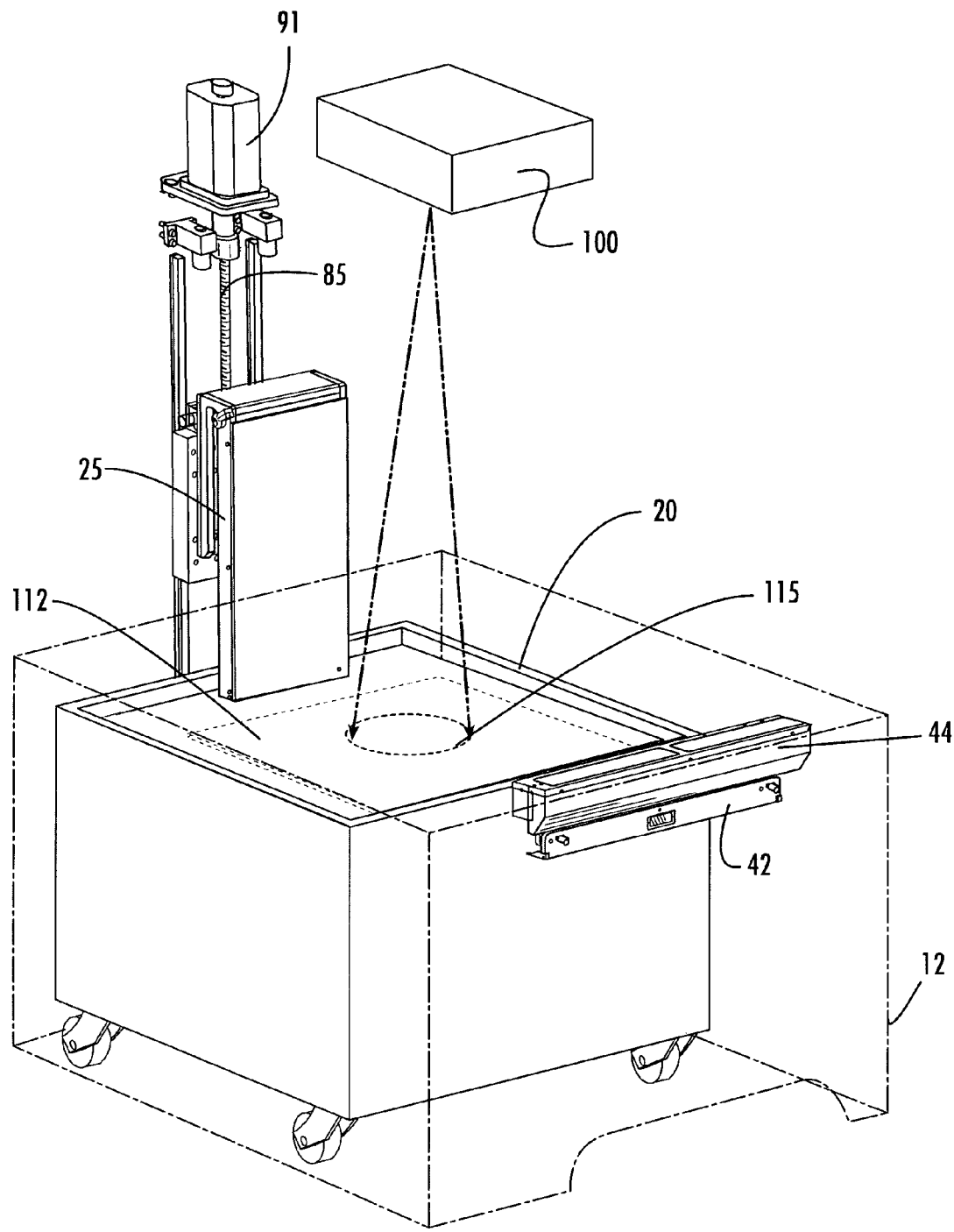
Figure 20:
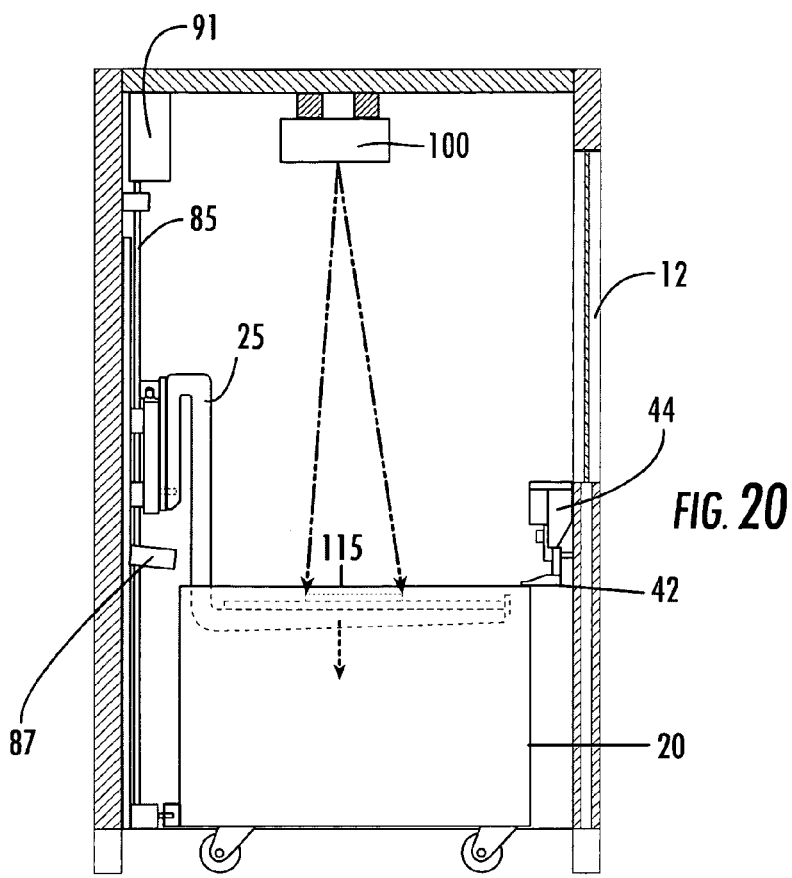
Figure 21:
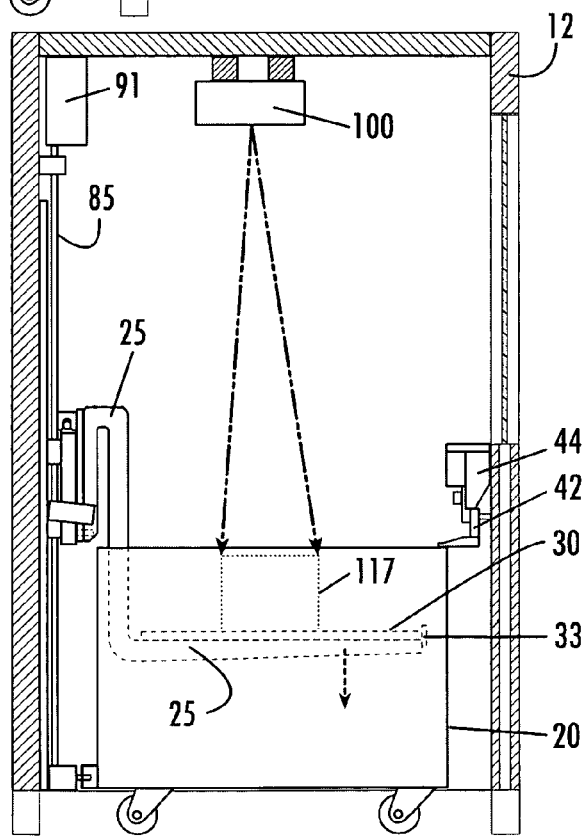
Figure 22:
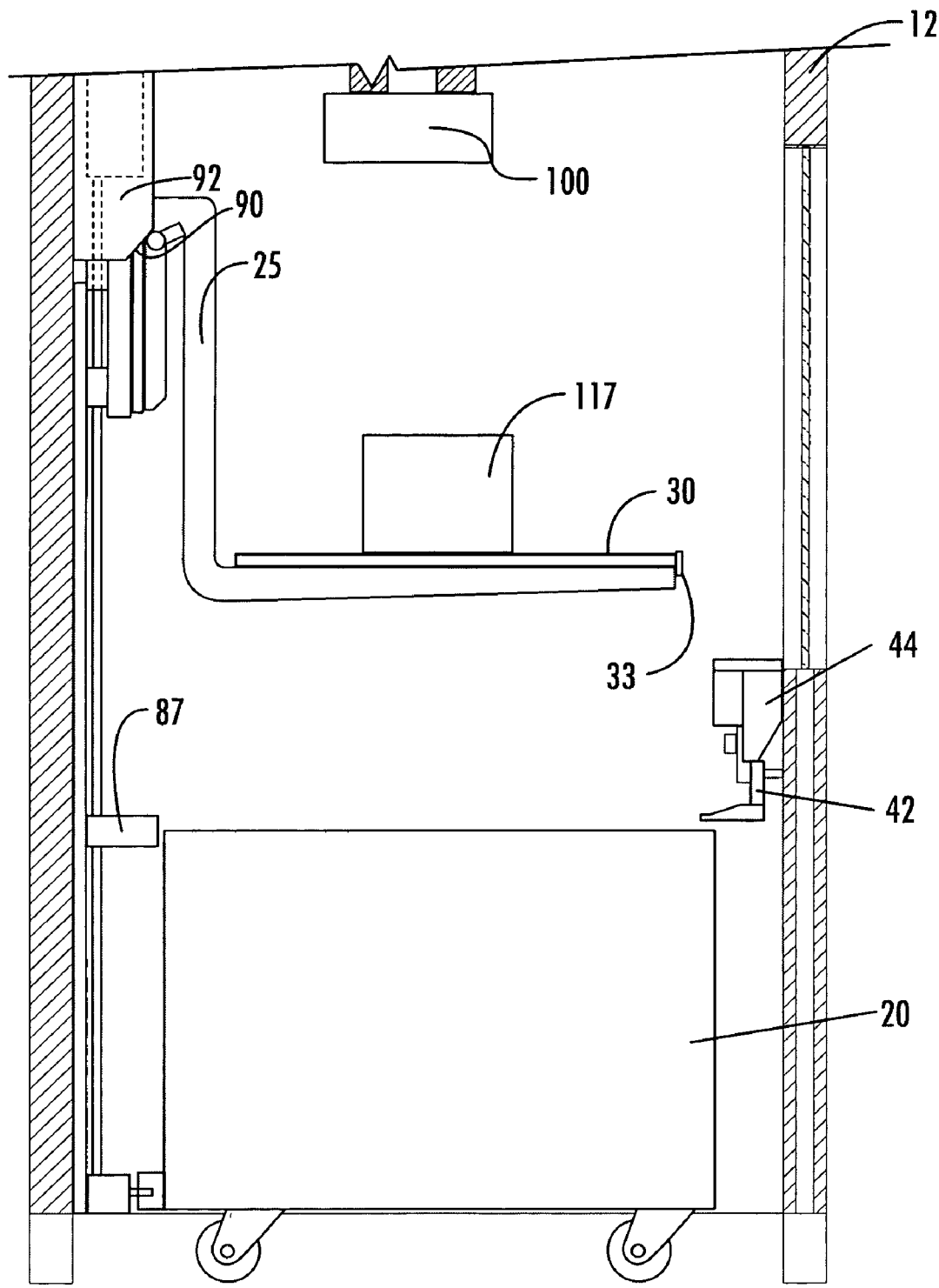
Figure 23:
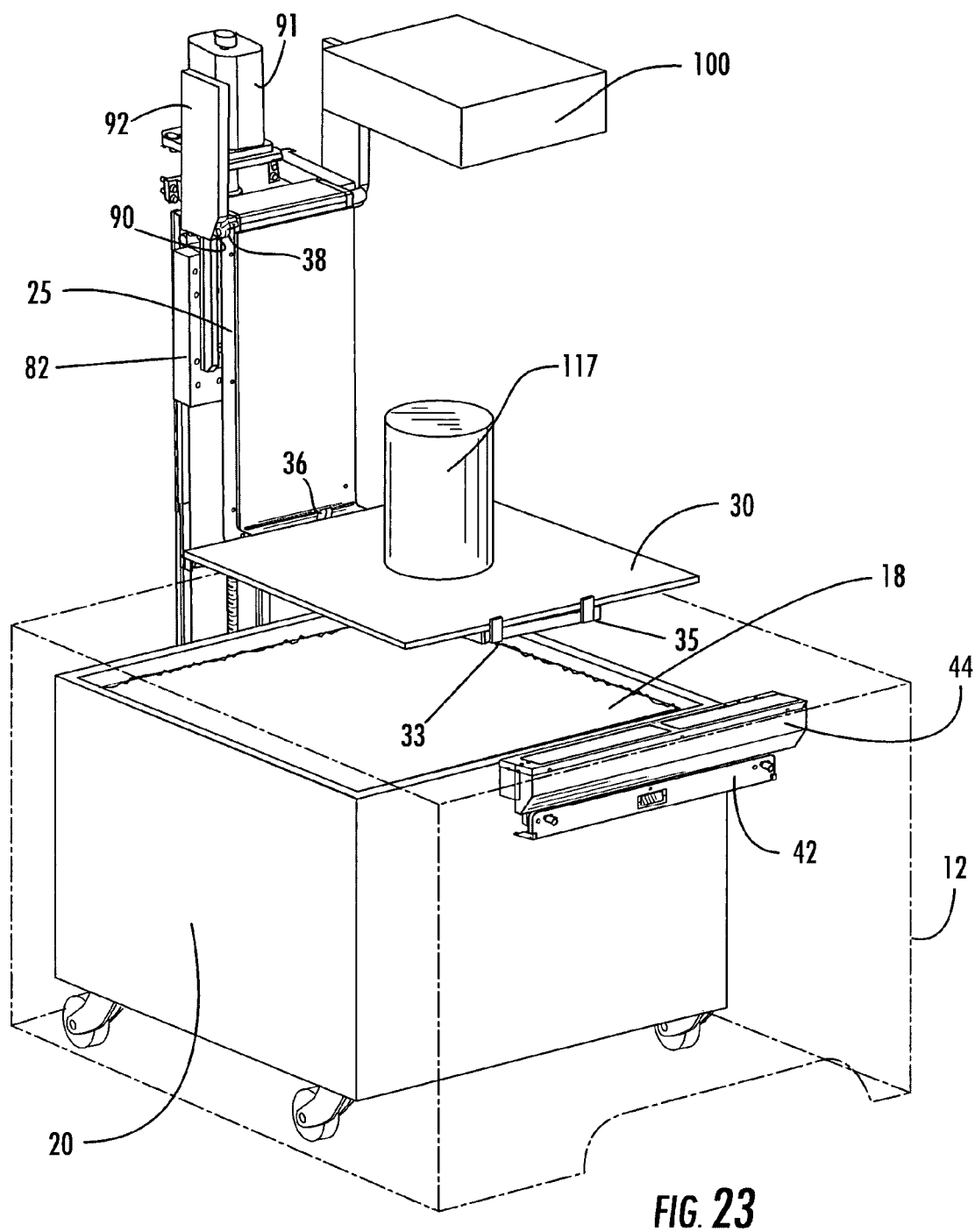
Figure 32:
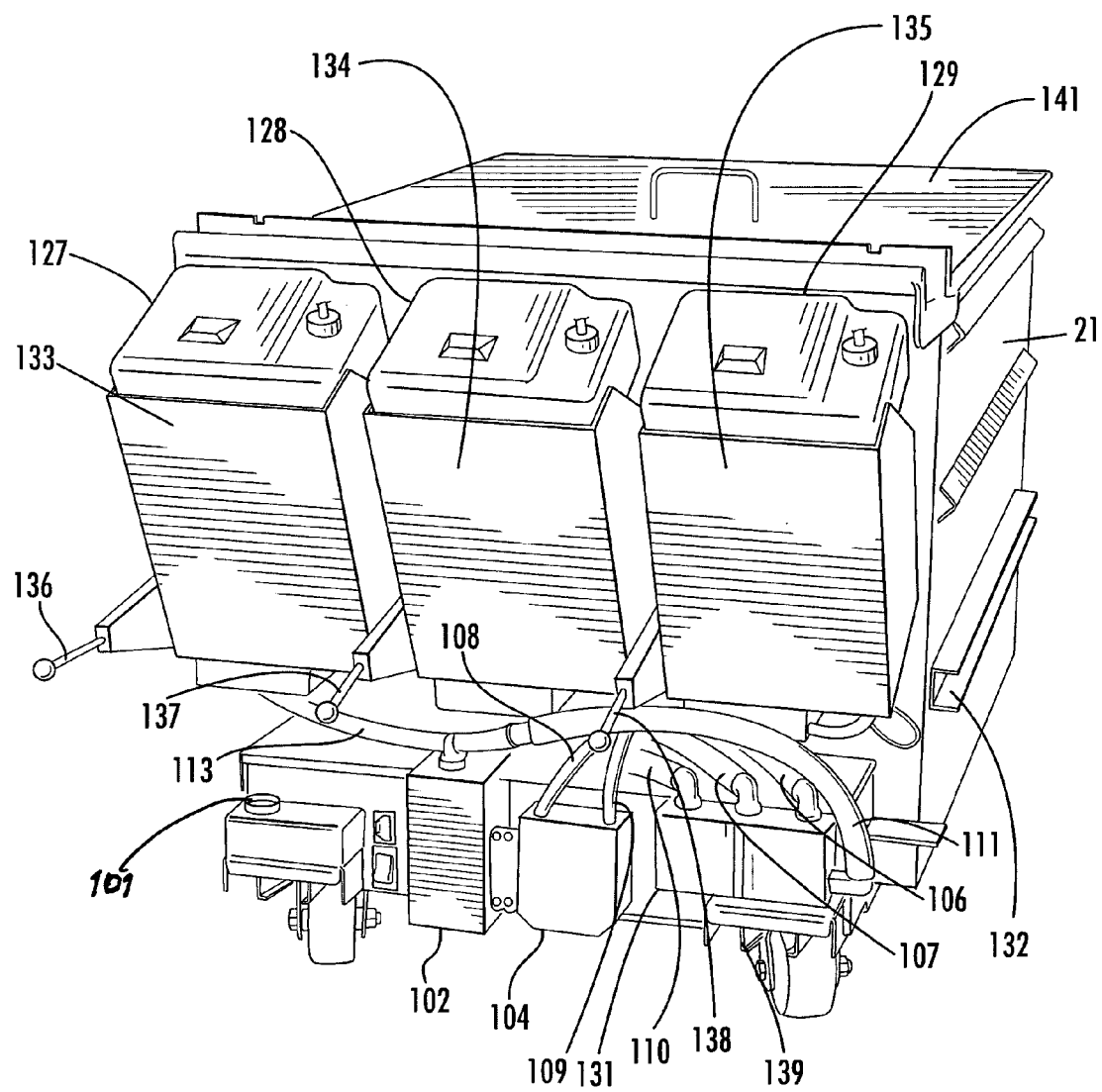
Figure 33:
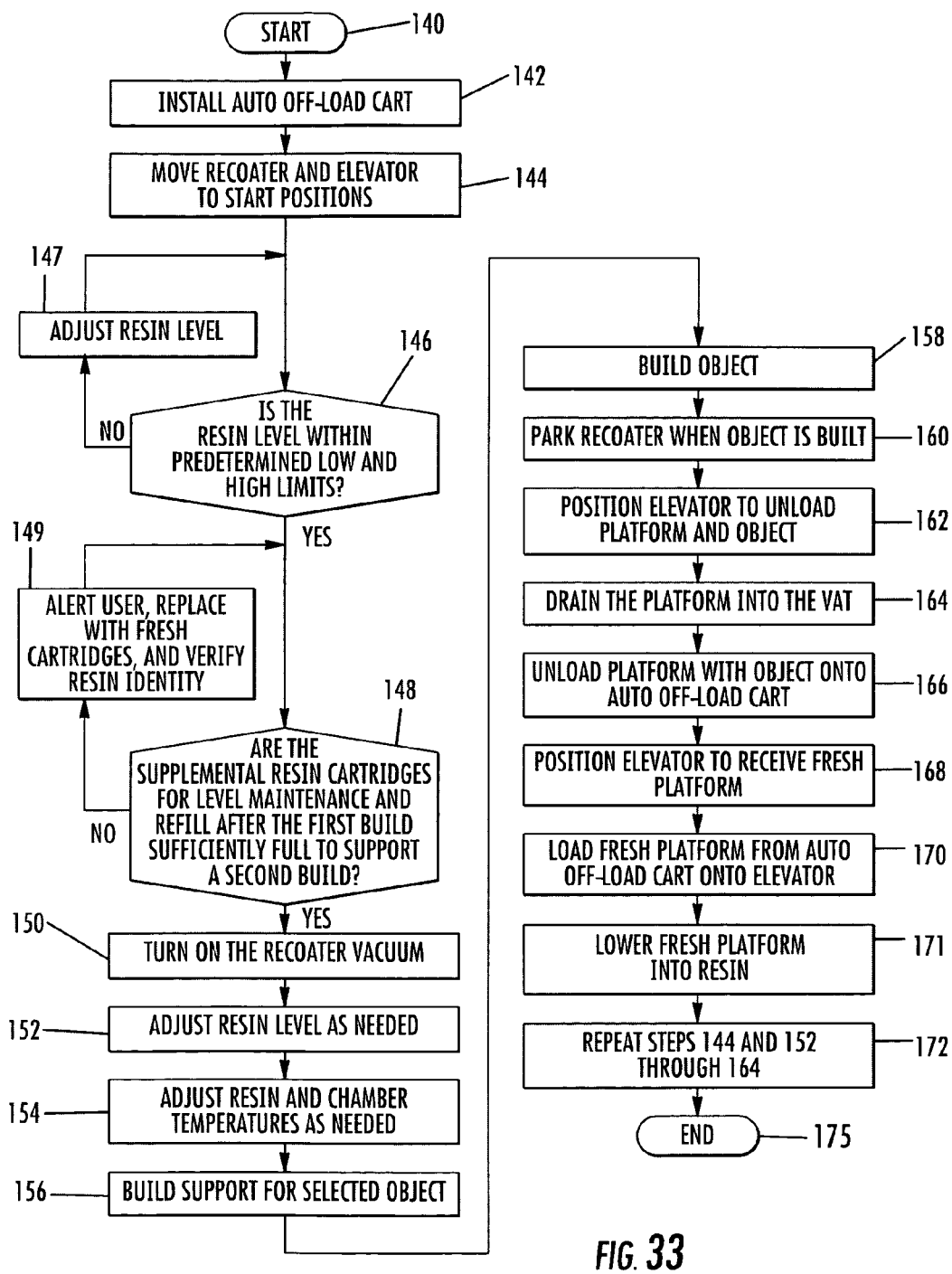

Having thus described the invention in general terms, reference will now be made to the accompanying drawings, which are not necessarily drawn to scale, and wherein:

FIG. 1 is a perspective view of a dual-chamber housing of the invention for producing objects by stereolithography and showing the resin vats associated therewith, one in shadow and one in perspective;

FIG. 2 is a perspective view of a resin vat showing disposed thereon in an exploded view, an object support platform and a subassembly of the elevator for raising and lowering the platform in the resin;

FIG. 3 is a perspective view of a portion of the elevator subassembly of FIG. 2 having portions removed therefrom to show various details of the elevator subassembly;

FIG. 4 is a perspective view of a recoater assembly of the invention;

FIG. 5 is an exploded partial perspective of a recoater carrier and recoater blade for one end of the recoater assembly of FIG. 4;

FIG. 6 is a partial perspective view of the underside of the recoater blade portion of FIG. 5;

FIG. 7 is a partial perspective view of the interior rear of a stereolithography chamber of the invention and showing a portion of a subassembly of an elevator;

FIG. 8 is a partial perspective and isolated view of the elevator subassembly of FIG. 7 and showing its relationship to a portion of the elevator subassembly of FIG. 2;

FIG. 9 is a partial perspective view of the elevator subassemblies of FIGS. 2 and 8 shown assembled;

FIG. 10 is a partially cut-away view of a portion of the chamber housing showing the axes of movement of the elevator, which is the vertical z axis, of the recoater blade and carrier, which is the horizontal front-to-rear y axis, and of a blade gap sensor, which are the y axis and the horizontal side-to-side x axis;

FIG. 11 is a sectional side view showing the resin cart entering into the process chamber;

FIGS. 12 through 14 are a series of sectional side views showing the resin cart in position in the process chamber and attached to the elevator, and elevation of the platform;

FIG. 15 is a highly schematic perspective view of the recoater assembly traversing the resin surface and a sensor obtaining readings for maintaining blade gap;

FIGS. 16A, 16B, and 16C are side views showing the recoater assembly isolated above the resin surface and obtaining readings for maintaining blade gap;

FIG. 17 is a highly perspective view showing the relation of the laser scanner and movement of the recoater assembly across the vat;

FIG. 18 is a perspective view showing evaluation of the stereolithography laser beam's spot size, focal length, and power in an extreme position;

FIG. 19 is a perspective view showing application of a laser beam to solidify a layer of resin;

FIGS. 20 and 21 are sectional side views of the perspective of FIG. 19 and show various stages of build completion of a single object build;

FIGS. 22 and 23 are, respectively, a sectional side view and a perspective view of the built object and platform raised above the level of the resin to the unload position;

FIGS. 24 through 31 are a series of side views showing operation of the auto off-load cart, including completion of the first build, removal to the cart, installation of a fresh platform, completion of the second build, and removal of the second build from the vat;

FIG. 32 is a perspective view of a resin vat of the invention with resupply resin containers and a level maintenance container mounted thereon; and FIG. 33 is a flow diagram showing the steps broadly taken in completing a second and unattended build.

DETAILED DESCRIPTION

The invention will now be described more fully hereinafter with reference to the accompanying drawings, in which preferred embodiments of the invention are shown. These embodiments are provided so that this disclosure will be thorough and complete, and will fully convey the scope of the invention to those skilled in the art.

Turning now to FIG. 1, shown generally at 10 is a dual-chamber housing for housing two chambers 12, 13 for stereolithography. The housing has two chambers for increased efficiency of laser usage. While the object surface in one chamber is recoated, the laser can be applied to the recoated object surface in the other chamber so as to build objects in both chambers in a single run. The laser and the system for using the beam in multiple chambers is addressed in detail below.

The housing has view windows 14, 15 on opposite sidewalls, one in each chamber 12, 13, respectively. Each chamber has a door 16, 17 with a hingedly openable and removable window. The windows are used for operating an automated system for unattended removal of a support platform and completed object and placement of a fresh object support platform for a second and unattended build.

Vat 21 contains a resin 18 from which the stereolithography apparatus creates three-dimensional objects. Vat 20 is shown in shadow disposed in chamber 12. Vat 21 is shown ready to introduce into chamber 13 through open chamber door 17. An elevator attachment bracket 23 is located adjacent the rear of the vat 21 for attachment to an elevator lift plate 82 (FIG. 8) enabling an object support platform 30 (FIG. 2), which is the platform on which the build takes place, to be raised and lowered in the vat with respect to the working surface of the resin. The elevator attachment bracket has hooks 86 (FIG. 8) by which attachment to the lift plate is secured.

The elevator attachment bracket and elevator lift plate cooperate as part of an elevator assembly that comprises several components all of which cooperate to lift and lower the platform. FIG. 2 shows disposed above vat 21 a subassembly 22 of the elevator components that can be introduced into and removed from the chamber with the vat. If desired, the removable subassembly shown in FIG. 2 can be dedicated to a single vat. These components include the elevator attachment bracket 23 rigidly fixed to a supporting elevator framework 24 and elevator forks 25 supported on frame 24. Frame 24 extends vertically so as to be capable of reaching the bottom of the vat. The forks on the frame cooperate with spaced supports 27, 28 extending laterally from the rear of the frame to support build platform 30. Latch 36 works with tabs 33 and 35 on the forward end of the elevator framework to secure and release the platform for automated installation and removal of the platform once the build has been completed and the elevator has been lifted from the vat.

It should be recognized that the above discussion of FIGS. 2 and 8 with respect to the elevator assembly and the subassembly 22 associated with vat 21 and chamber 13 applies equally to vat 20 and chamber 12 and that vat 20 will have similar elevator components and an object support platform. In this regard, the discussion below of the elevator assembly and subassemblies, recoater assembly, vat, process steps, and operation of the auto off-load cart in the context of one vat or chamber applies equally to another vat or chamber.

FIG. 3 shows the frame 24 and elevator forks 25 for supporting platform 30 with sheet metal covering removed and exposes a latch linkage 37. Latch linkage 37 is operable to actuate latch 36 to secure the platform in conjunction with tabs 33 and 35 on installation and to release the platform from the forks for removal from the system. The latch linkage is actuated by a spring biased rod 38 to cause 36 to secure the platform to the forks when installed on the forks and then release the platform for removal when the platform is sufficiently elevated above the vat.

Figure 28:
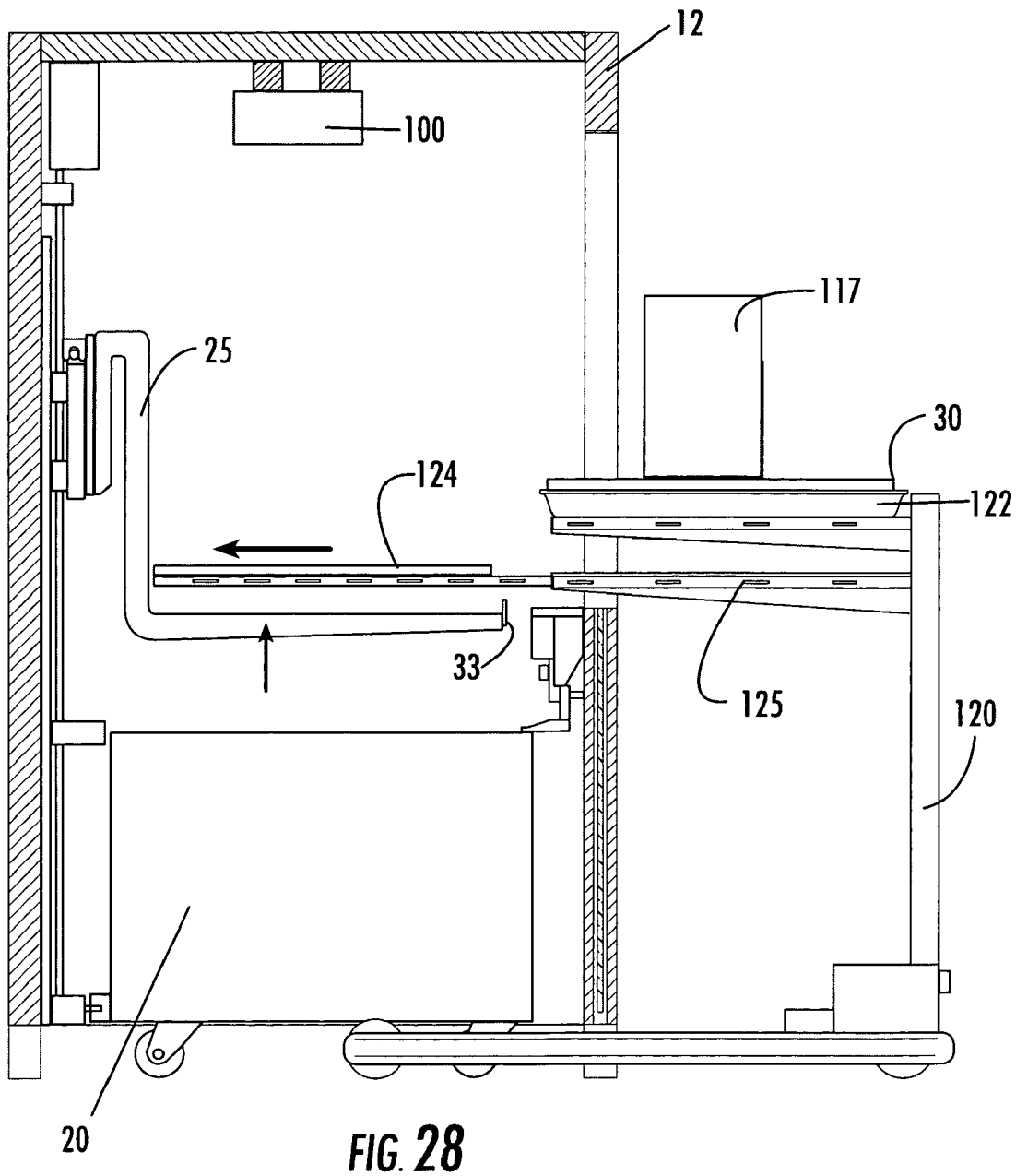
Figure 29:
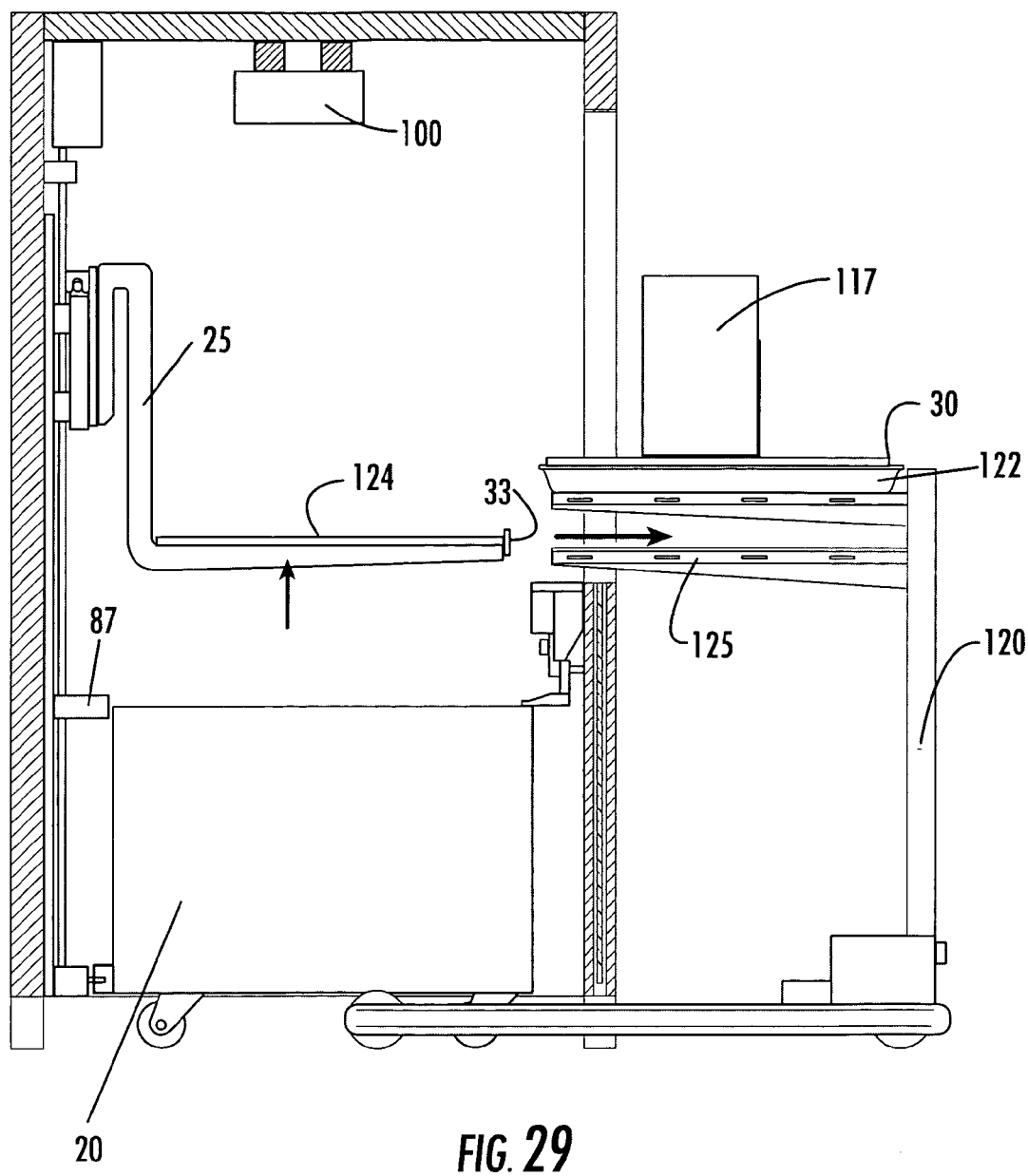

Actuation of the latch linkage for release of the build platform from the elevator forks is illustrated in FIG. 9 with reference to FIGS. 22 and 23. FIG. 9 shows the platform 30 secured to the elevator forks 25 within the chamber 12 and within vat 20 within the chamber. When the elevator assembly is raised sufficiently high, rod 38 engages a ramp surface 90 on a chamber component frame 92 (FIGS. 3, 9, 22, and 23). As the elevator continues to rise, the ramp forces the latch release rod outwardly toward the platform and actuates the latch linkage to release latch 36. Similarly, when a platform is installed on empty forks and the elevator assembly is lowered so that the ramp does not engage the release rod, then a spring biases the latch release rod and linkage to close the latch and secure the platform against tabs 33 and 35 on the forks (FIGS. 28 and 29).

FIGS. 7 and 8 illustrate in detail a second subassembly 39 of components of the elevator assembly. FIG. 7 illustrates the subassembly in the context of the stereolithography chamber and FIG. 8 illustrates the subassembly in relation to the elevator attachment bracket 23 of the first subassembly. These components of the second subassembly are fixed in stereolithography chamber 12 along the back wall 80 (FIG. 7) opposite door 16 (FIG. 1) and do not enter or exit with a vat as do the components of the subassembly 22 shown in FIG. 2. These fixed elevator components of the second subassembly of FIGS. 7 and 8, the chamber elevator components, receive the elevator components of the first subassembly, the vat elevator components (FIG. 2), and specifically the elevator attachment bracket 23 of FIG. 8, to form, in combination, an entire elevator assembly. The elevator assembly with the two subassemblies connected is shown in FIG. 9 in a perspective view.

Elevator lift plate 82 includes a locating pin 83 for fitting into a receiver 96 of FIG. 9 on elevator attachment bracket 23, locating attachment bracket 23 and thereby the elevator frame 25 and forks 24 in the horizontal x,y plane. The elevator lift plate 82 includes a rod 84 that engages the hooks 86 on the attachment bracket 23 (FIG. 8) for raising and lowering the attachment bracket and associated frame and forks within and out of a vat of resin. A lift screw 85 is shown in FIGS. 7 and 8 for the elevator lift plate 82. Lift screw 85 is turned by motor 91 to lift and lower the elevator lift plate, attachment bracket, frame, and forks along the vertical z axis. Also included is a locating pin 88 for locating the resin vat 20 in a horizontal plane parallel to the x,y plane of the surface 112 of resin 18 (see briefly FIG. 12).

FIG. 10 illustrates in partial perspective the elevator lift plate 82 positioned on the z axis to receive a vat of resin in stereolithography chamber 12 and the positions in relation thereto of the laser scanner 100 and recoater blade and carrier, 42 and 44 respectively. The sequence of steps of rolling a vat into a stereolithography chamber and preparing a build are shown in FIGS. 11 through 23. As a vat with its elevator subassembly and secured platform are rolled into a stereolithography chamber of the invention and centered on locating pin 88, then the attachment bracket 23 is aligned vertically with the elevator lift plate 82 and lift rod 84 (FIGS. 11 and 12). Motor 91 turns lift screw 85 to raise the elevator lift plate (FIG. 13). As the lift plate rises, the lift rod engages and seats in hooks 86 on the attachment bracket 23 (FIG. 13) and locating pin 83 engages and seats in receiver 96 (see briefly FIG. 8) on the attachment bracket, thereby joining the chamber elevator and vat elevator subassemblies and centering the vat elevator subassembly within the vat. As the lift plate rises farther still, the vat elevator subassembly and platform rise within the resin (FIG. 14.). Raising the lift plate sufficiently releases the latch 36, as discussed above. Lowering the lift plate sufficiently releases the lift rod from engagement with the attachment bracket so that a vat and vat elevator subassembly can be removed, if needed. Normally, the vat is removed separately from a platform having a build upon it.

Turning now to a discussion of the recoater assembly and its use for mapping the blade gap prior to a build, FIG. 15 illustrates a sectional view through chamber 12 of a recoater blade 42 and carrier 44 traversing the resin working surface 112 in the y direction. The recoater assembly is identified generally at 40 (FIG. 4). The recoater assembly includes a recoater blade 42 and a carrier 44 to which the recoater blade is attached and which provides for movement of the recoater blade. The recoater blade is computer controlled to move along the axes as shown: 1) horizontally back and forth across the surface of the resin, in the y axial direction, 2) vertically up and down in the z axial direction, and 3) rotationally about the center of the blade, which is the axis theta, parallel to and spaced from the y axis. A conventional function of a recoater blade and of the one illustrated is to speed up leveling of fresh resin layers between laser scanning exposures of the working surface 112, which typically provides parts of greater accuracy in a shorter period of time than deep dipping and gravity settling.

The carrier for the recoater blade of FIG. 4 is mounted to a vertical motion stage 47. Vertical motion stage 47 sits in a track 49 for translating the blade in the up and down direction along the vertical z axis. Track 49 in turn mounts into track 50 and travels in track 50 to advance the recoater blade across the surface of the resin, in the horizontal y axial direction. Cable drives and associated stepper-based linear actuator motors have been determined to be suitable for use in these aspects of the practice of the invention.

The recoater assembly of the invention includes a sensor 45 for providing readings to a controller to keep the recoater blade parallel to the resin surface throughout its length of travel. Each end of the recoater blade is kept at the same distance from the resin surface. The sensor is contained within carrier 44 and is translatable in the x axial direction along the length of the carrier so that distance readings can be obtained in different locations along the x axis of the surface of the resin. A cable drive contained in the carrier can be used to translate the sensor in the carrier, powered by a motor in the vertical motion stage 47.

The distance of the recoater blade from the resin surface when sweeping across the surface is termed "blade gap." The blade gap typically depends on the resin chosen for the particular build and its physical characteristics, and is a quantity that is empirically predetermined for the build and stored in the stereolithography control computer's memory. The function of the sensor 45 is to provide the data necessary to keep the blade gap as specified throughout the range of travel of the recoater blade across the resin surface. Variances in the tracks in which the recoater assembly travels and other sources of machine error can change the blade gap. The computer controlled recoater assembly of the invention substantially resolves these problems, taking what has been a hardware problem in the industry and providing a software solution.

Sensor 45 is a laser diode sensor and is a high resolution sensor with a narrow measurement range. An Omron optical sensor Model No. ZXLD30, available from Omron Electronic Components in Schaumberg, Ill., has been determined to be useful as the sensor 45. The Omron sensor is highly sensitive and works by emitting a focused energy beam to contact the target and then receiving the reflected beam, from a comparison of which distance to the target can be determined with a degree of accuracy sufficient for stereolithography.

The recoater blade 42 is kept parallel to the resin surface in response to data obtained by the Omron sensor 45 prior to the start of a build. The sensor obtains data from which the computer controller determines the distance from the bottom 76 (FIG. 6) of the recoater blade to the top or working surface 112 (FIG. 12) of the resin along a variety of points y at two points x along each side of the resin vat corresponding to the two ends of the recoater blade. FIGS. 4, 5, 6, 15, 16A through 16C, and 17 illustrate interaction between the Omron sensor and the recoater assembly to obtain this data and map the adjustments to the recoater blade that will be made during a build. During a build, the computer controller rotates the recoater blade, in response to the map obtained prior to the build, about its axis of travel, theta, which is an axis parallel to and spaced from the y axis of the resin surface, to keep the two ends of the recoater blade the same distance from the resin surface at spaced points x along the y axis. The data based on which the blade is rotated is not obtained in real time, and the difference between real time data and a map obtained prior to the start of a build has not been determined to be significant.

FIGS. 5 and 6 show an end portion of the recoater blade 42, taken along the x axis and corresponding to the right hand end of the recoater blade illustrated in FIG. 4. FIG. 6 shows the same end as FIG. 5 and from the bottom of the blade to fully illustrate the blade's features. Feet 56, only one of which is shown, extend laterally outwardly from the bottom of the blade on each end, the bottom surface of which, surface 60, defines the bottom of the blade for measurement purposes. Each foot is cut down or precision ground to a thin surface 58 on the end of the foot away from the blade at the top surface for obtaining the Omron sensor readings for the bottom of the blade. The distance from the bottom of the foot, 60, to the top surface of the cut down portion, 58, is fixed and stored in the computer. This foot depth distance is small owing to the operating range of the Omron sensor.

To obtain readings, the Omron sensor is set within the carrier at a point along the x axis, adjacent to one end of the recoater blade. FIGS. 4, 15, and 16A through 16C show the sensor 45 in shadow in the carrier adjacent the left end. The blade does not touch the resin when obtaining readings and no resin obscures the top of the foot from the Omron sensor. As shown in FIG. 15 in the context of the chamber and in FIG. 16A in a detailed view, at a fixed location x, y, the Omron sensor 45 takes a reading of the distance from the sensor to the top 58 of the foot 56 to assign a value for the foot position corresponding to the bottom 60 of the foot and based on the predetermined depth of the foot between the surface 58 and bottom 60. As shown in FIG. 16B, at the same location y as in FIG. 16A, the Omron sensor is displaced a small distance x to approximate the same location x as the foot and sufficient to enable the Omron sensor to take a reading from the sensor to the top of the resin surface, 112. The computer control determines the difference between these two readings for the bottom of the foot and the resin surface and stores the datum. As shown in FIG. 16C, the recoater assembly then translates a distance y as indicated by the arrows to obtain additional data points until the entire surface along one side of the vat has been mapped at a variety of points y for one x. Thereafter, the Omron sensor translates to the opposite side of the carrier, the right side, to obtain data mapping that side of the vat at different locations x and the same locations y to complete the map. The entire map is obtained by computer control and stored for use during the subsequent build.

The recoater blade 42 can be attached to and removed from the carrier 44 entirely by hand. The stereolithography system's computer controls alignment of the recoater blade and substantially reduces the tedious procedures associated with prior apparatus. Turning now to FIGS. 5 and 6 and a discussion of the features of the recoater blade and carrier that provide for ease of installation and removal of the blade, knurled handles 55, only one of which is shown on the recoater blade of FIG. 6 are used for installing the recoater blade and removing the recoater blade from the carrier by hand. It should be recognized that there is a corresponding handle on the end of the blade not illustrated in FIG. 6, as can be seen in FIGS. 4 and 17 through 19. A receiver 64 on the recoater blade (FIG. 5) receives a corresponding alignment pin 66 on the recoater carrier. Pin 66 is illustrated round in cross-section and this shape can be varied. It may be desirable to provide a second alignment pin of a different shape on the opposite end of the recoater carrier and a corresponding receiver on the blade. These alignment pins assist the operator to make sure the blade is correctly oriented on the carrier. Magnets 70 and 71 or other attachment means, one at each end of the blade carrier and one at each end of the recoater blade, respectively, secure the recoater blade on the carrier. Other attachment means can be used, although these may require tools for installation or removal of the blade. Contacts 72 can be provided to activate a proximity switch 75 for indicating that the blade is properly secured in place on the carrier. It is useful to provide three such contacts, one on the end of the carrier as shown, and two on the opposite end so that a three-point contact is required to activate the proximity switch to signal correct position for the recoater blade on the carrier.

The recoater blade includes a vacuum channel 77 on its bottom surface 76 seen in inverted position in FIG. 6. The vacuum channel aids in leveling the fresh resin layers in a conventional manner. The blade includes a centrally located sight window 78 (FIG. 4) for sighting by an operator whether the vacuum is activated. The vacuum connection between the blade and carrier is not hard plugged and requires no tools to complete. The vacuum connection is "soft" in that connection is provided between cooperating and sealing vacuum ports located centrally of the blade and carrier, typically a vacuum cup on the blade and a cooperating member on the carrier.

Prior to installation of the vat in a stereolithography chamber, the recoater assembly is "parked," which is to say the recoater blade is located on the y axial direction nearest the door of the chamber and is raised in the z axial direction out of the way of the vat which has wheels affixed to its bottom so it can be maneuvered like a cart (FIGS. 11 and 12). The vat can be rolled into the chamber without striking the recoater assembly. Once the vat is installed, the recoater assembly can be lowered adjacent to and spaced from the surface of the resin for mapping the relationship between the resin surface and the bottom of the recoater blade (FIG. 17). The invention accomplishes mapping with the recoater blade held a greater distance above the resin working surface than the blade gap, a distance sufficient to make sure the feet on the blade do not become covered with resin, which would negatively impact the ability of the Omron sensor to develop the data needed to control the blade gap.

When a build begins, the recoater blade vacuum is turned on and the blade is lowered to the predetermined blade gap for the resin (FIG. 14). The vacuum pulls resin up into the vacuum channel 77 in the blade and into the sight window 78. The feet typically will have resin over them as the blade sweeps the surface, which can occur for each application of a fresh resin layer to the build on the platform.

The accuracy of the build is very sensitive to maintaining a precise level of the resin in the vat. The build plane is established prior to the start of a build. The laser scanning system 100 (FIG. 19) is rigidly mounted to the chamber and is controlled to strike the resin working surface at a particular point in space, termed the "build plane," which establishes the range of z values in which the x,y plane of the working surface can be located. The ability of the invention to automate effective leveling of the recoater blade depends on keeping the resin at the same level as when the map of the resin surface was established prior to the build.

A second Omron liquid level sensor is shown at 87 (FIGS. 7 and 9) and is rigidly fixed to the elevator frame in the rear of the chamber housing for determining the level of resin in the vat and whether additional resin should be added to the vat. Sensor 87 determines whether resin needs to be added or removed to maintain a build plane during a build. During the build, the sensor (FIG. 30) determines the level of resin in the vat so that resin can be added or removed to maintain the same level at all times and thus at the same distance from the blade as that obtained during mapping. The Omron sensor is a laser diode sensor operating closed loop in that the sensor operates between successive scans by the laser of the working surface and shuts off when the appropriate resin level is reached.

A vat 21 with supplemental resin containers 127, 128, 129 for use in controlling the resin level is illustrated in FIG. 32 with a removable cover 141. Resin containers 127, 128 and 129 are retained in tiltable receptacles 133, 134 and 135 respectively which are pivotable away from vat 21 by engaging handles 136, 137 and 138 to facilitate ease of installation and removal. Each container 127, 128, and 129 connects to vat 21 via a quick disconnect double shut off coupling. Each container 127, 128, and 129 has a nozzle that mates with a coupling (both not shown) inside the corresponding receptacle 133, 134, and 135 on vat 21 so that when connected resin is able to flow from the container through the coupling into the vat 21. Each nozzle has molded or otherwise integrated into it an RFID tag. Each coupling is a "smart coupler" because it has molded or otherwise integrated into it a reader to sense and pass on to the stereolithography system's control computer data about the container and resin in it, such as resin type, resin batch number, expiration date, resin volume and potentially the vat and stereolithography system identities in which the container is being used. The readers are proximity readers so the stereolithography systems' control computer can alert the operator with an alarm before the container nozzle is couplingly connected to the vat via the receptacle coupling if the incorrect resin or an expired resin is being installed in the container. This data flow between the vat and the stereolithography system's computer occurs through the data and power port 101 when the vat and the stereolithography system are connected via appropriate cabling. Each container can also track the amount of resin that flows from it into the vat. Two of the supplemental resin containers, 127 and 128, refill the vat between builds and operate through bellows pump 102 to supply a sufficient stroke volume of about a liter of resin per minute for a 420 liter capacity vat. Two Omron ultrasonic sensors (not shown) mounted on a wall of the vat 21 determine whether the resin is within preselected minimum and maximum values prior to a build to signal whether resin needs to be added. Each vat 21 also has an RFID tag 19 on the outside wall on which the elevator attachment hooks 86 of FIGS. 11 and 12 are supported which is read by a reader 81, and passes the data about vat identify, initial resin quantity, and data of installation on to the stereolithography system's control computer.

Resin is supplied first from one container, for example 128, via line 106 and when that container is emptied, from the other container, for example 127, via line 107 by the valve assembly 131 having the appropriate valve opened by the stereolithography control computer in response to the sensing from the ultrasonic sensor that the resin is below the minimum level prior to the start of a build. Replenishing resin flows from the supply container through valve assembly 131 and supply line 111 to the bellows pump 102 via an inlet port and through an outlet port (both not shown) to vat 21. The other of the containers, 129, acts as a reservoir via inlet line 108 and outflow line 109 to lower or increase the level in the vat in response to fluctuations during a build by means of a two-way flow valve in the valve assembly 131 that is actuated similarly by a command from the stereolithography system control computer in response to the sensing by sensor 87. The liquid level sensor 87 takes a reading of the precise level in the vat between each layer. The resin may shrink when solidified. Displacement of resin by the platform and build as these are lowered may impact the level of resin in the vat. A useful pump for controlling resin level during a build is a metering pump, such as peristaltic pump 104, for delivery of small, precisely controlled amounts of fluid and may take several strokes to add or remove resin so that the level in the vat can be closely controlled. A peristaltic pump can supply about 1 micron of fluid volume over several strokes to provide precise control. Valve assembly 131 can also circulate resin from the vat 21 through line 110 through valve assembly 131, line 111, bellows pump 102, line 113, and back into vat 21, if needed. This circulation feature can help preserve the quality of the resin in the vat 21 and prevent viscosity increases. It can best be employed between builds either automatically or operator initiated through the stereolithography control system's software.

It should be recognized that the focal plane of the laser beam emitted by the Omron sensor is the same whether at the resin surface or the plane of the recoater blade. A conventional beam profiler system employing a detector array and establishing a Gaussian beam distribution determines the beam location and width of the laser beam. The system can change the focal length of the beam using a 3-axis scanner that is self calibrating and permits customized blade gap settings for different resins. Storage of this information over time will establish a library of data log files for particular resins in individual systems of the invention.

It is useful to mark the resin containers with radio frequency identification tags (RFID technology) so as to ensure accurate resin replacement and to avoid the costly error of mixing different resins. An operator can be alerted prior to connecting the resin vat to the supplemental container if the resins are different and can obtain confirmation of the correct resin.

Laser systems of the type typically used for stereolithography are useful in the practice of the method and apparatus of the invention. An x,y scanning laser employing mirrors controlled by galvanometers to position the laser beam are useful. A scanning system 100 is illustrated in a highly schematic view in FIGS. 19, 20, and 21 applying energy to the working surface 112 of the resin, the build plane, in a predetermined path to solidify a layer 115 of an object 117. A laser window normally isolates the laser and galvanometer systems from the process chamber, which is heated.

Dynamic beam deflectors can be used to generate more than one sequential path for the laser beam so that the laser can be used more effectively. To increase efficiency, a single laser can be used in connection with the practice of the invention to provide energy to two or more separate stereolithography chambers 12, 13 (FIG. 1) and galvanometer systems for simultaneous builds. While a three-dimensional object in one chamber is being recoated with a layer of fresh resin, the laser can be conducting a scanning exposure in the adjacent chamber so that the laser does not sit idle between recoats of a build.

The laser control system is capable of dynamically changing the laser focus so that larger objects can be produced without a loss of precision. As shown in FIGS. 9 and 18, detector cells 89 located in the rear of the chamber and mounted to the chamber elevator subassembly frame 92 provide information for controlling the intensity, focal length, and spot size of the laser beam that is provided by scanner 100 (FIG. 18) and is used to solidify the resin. As with the Omron sensor, a 3-axis scanner is useful to change the focal length and spot size of the laser so that the build is the same quality and precision whether in the middle of the resin or at the outer edges of the vat.

FIG. 19 shows in perspective illustration the scanning exposure of the laser in the x,y plane of the surface of the resin. The progress of the build is shown in FIGS. 20 through 23. It should be recognized that the support layers for the desired object are the first to be solidified. As shown in FIG. 20 in a section through the chamber, the support platform is gradually lowered as cross-sectional layers 115 are solidified by application of the laser beam. The laser solidifies a layer, the elevator lowers the platform to provide a fresh layer of resin and the recoater levels the resin to provide one layer thickness. After multiple sequences of scanning exposure of the laser and recoating with resin, the platform has been lowered to a greater depth as shown in FIG. 21 and a single build object 117 has been completed. The elevator then removes the build and platform from the resin to the unload position as shown in FIG. 22 in section and in FIG. 23 in perspective.

Figure 24:
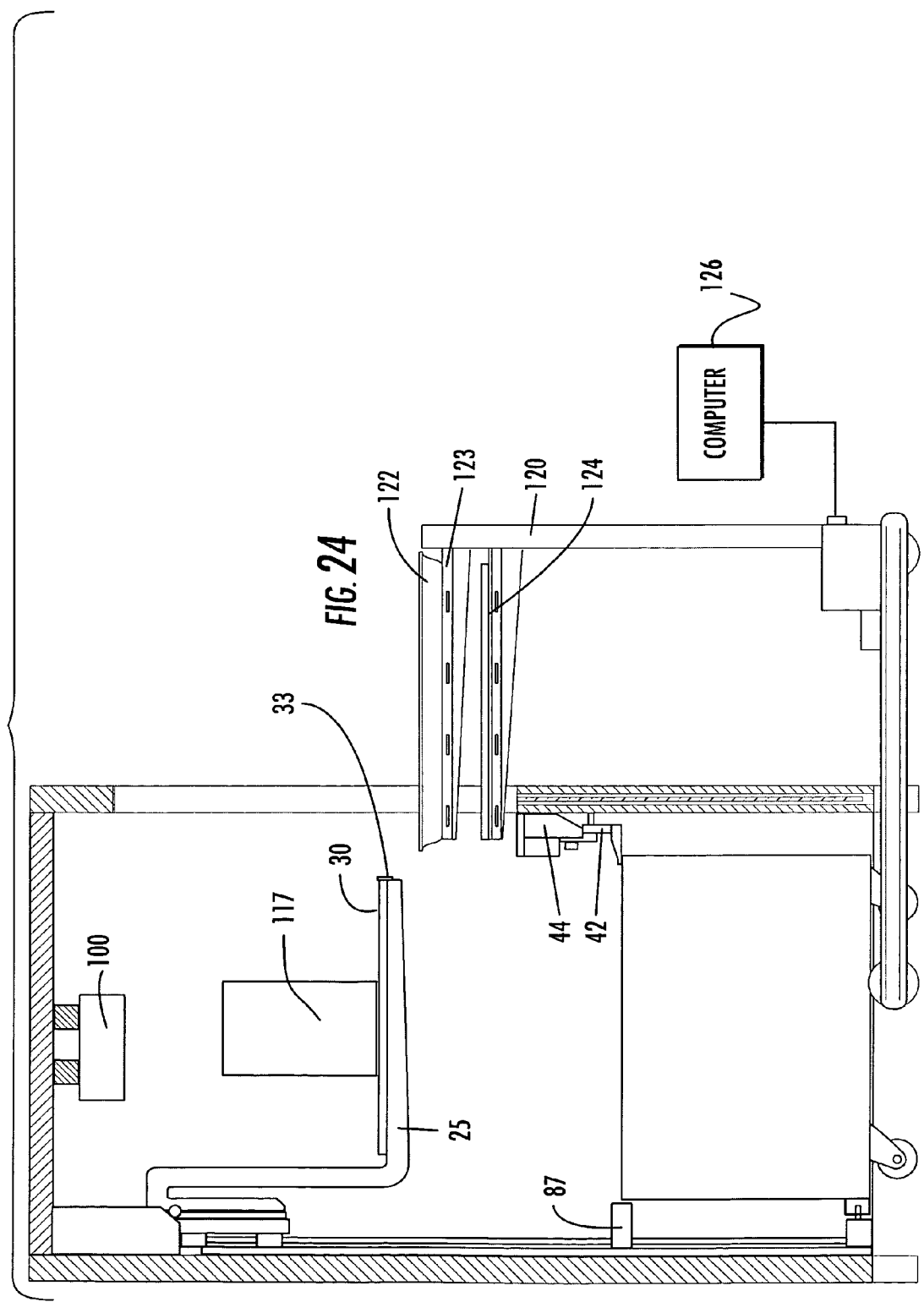

FIGS. 24 through 31 illustrate the sequence of steps involved in automated offloading of a completed build and supporting platform and in completing a second build. FIG. 24 shows a side view of a stereolithography chamber of the invention having a completed build object 117 supported on a platform 30 and elevated for release of the platform latch as discussed above. A perspective view of this stage of the completed build in the chamber is shown in FIG. 23. It should be recognized that the recoater blade 42 and carrier 44 are parked prior to elevation of the build out of the resin. Also shown in FIG. 24 is an auto offload cart 120 connected to a computer control 126 for carrying out the unattended platform swap by which a second build can occur. Cart 120 has telescoping arm segments 123 and 125 (FIG. 25) for, respectively, supporting and conveying a drip tray 122 for offloading the build object 117 and platform 30 and for supplying a fresh platform 124 for the vat.

The side sectional view of FIG. 24 illustrates that the offload cart is rolled into contact with the door 16 or 17 of FIG. 1 of a stereolithography chamber from which the window has either been manually removed or swung to the open position, and under a portion of the resin vat. As shown in FIG. 1, the doors have brushes defining an opening at the bottom through which the rollers of an auto offload cart enter. The auto offload cart should be docked with the vat so that the telescoping arms coordinate with the vat and elevator for a flawless platform exchange. FIG. 32 illustrates fittings 132 and 139 that can be used to ensure docking to the resin vat. Docking is not automated, and is performed by an operator who also connects the cart to the controller system 126 for the stereolithography system (FIG. 24). The window in the chamber door, 16, 17, (FIG. 1) is hingedly opened or removed by the operator so that the automated build removal can proceed.

Figure 25:
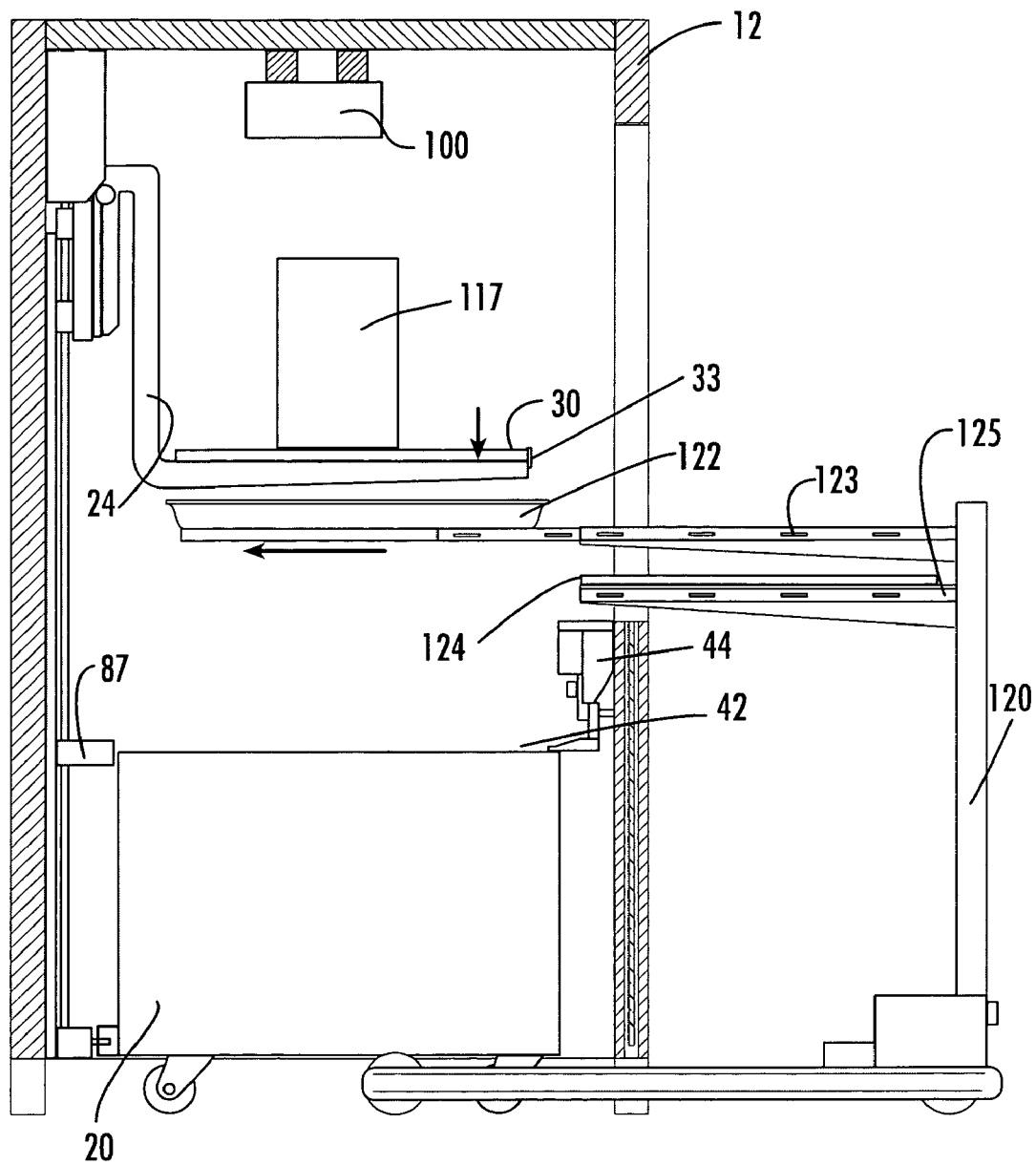
Figure 26:
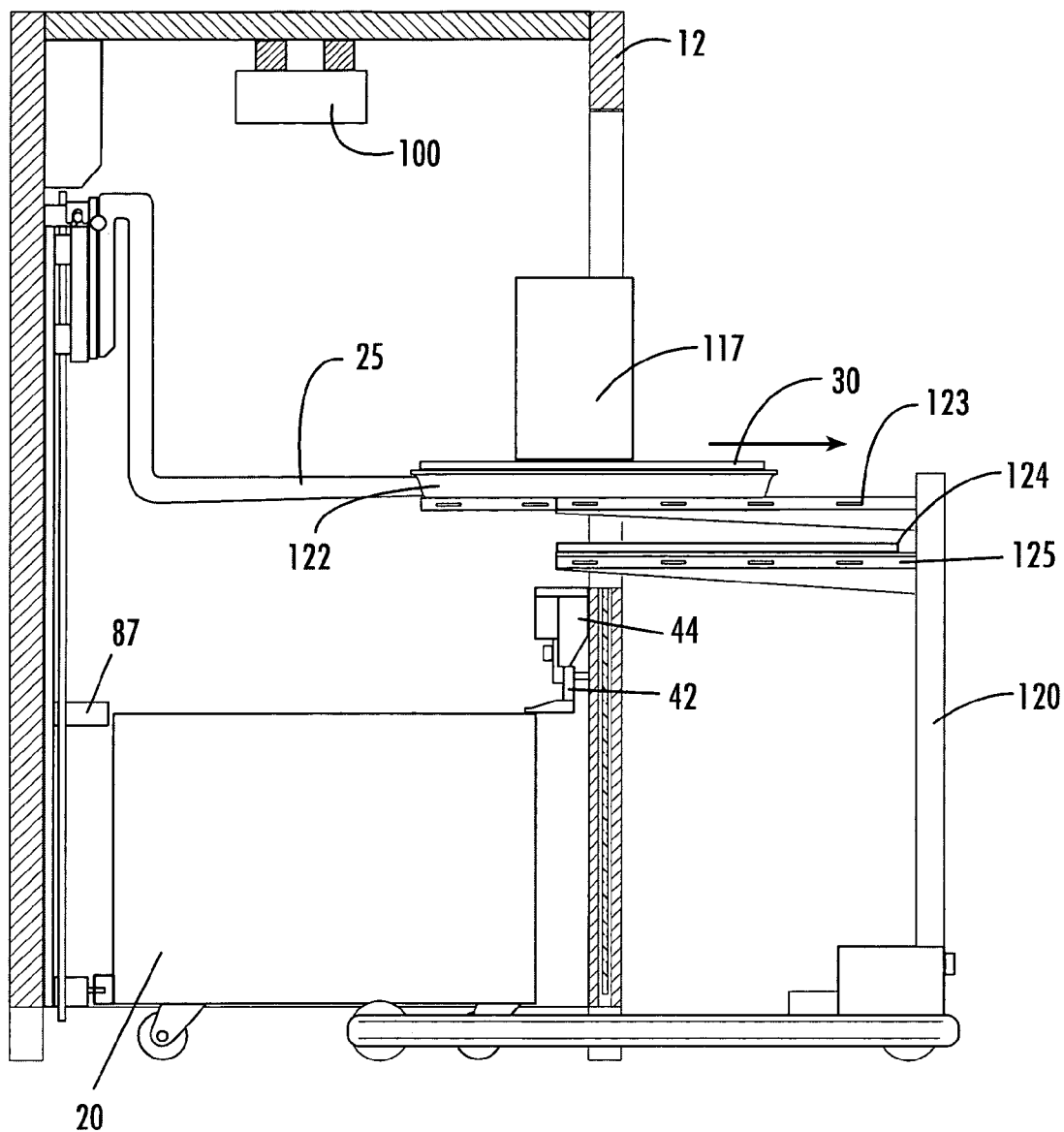
Figure 27:
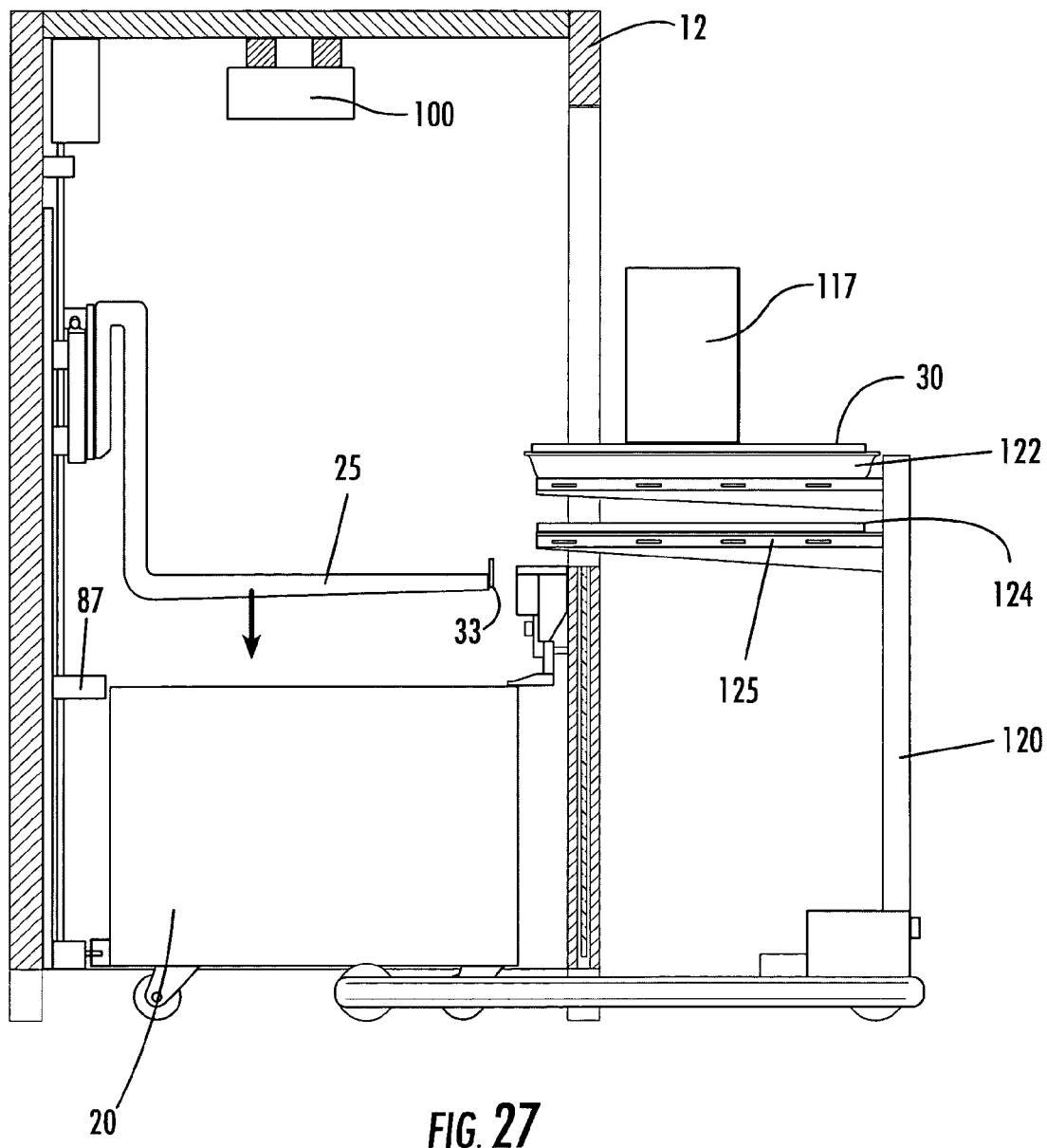

At the end of the build, the platform 30 and build object 117 are elevated sufficiently high to release latch 36 securing the platform against tabs 33 and 35 to the forks and frame 24. A telescoping arm 123 extends from the cart having a drip tray 122 thereon so that the elevator frame 24 is disposed above the drip tray (FIG. 25). The elevator frame is lowered and the drip tray and forks are configured so that the platform and build rest on the drip tray and the frame passes through (FIG. 26). Telescoping arm 123 is retracted and the build object and platform are removed from the chamber to rest on the cart. The elevator frame is then lowered to receive a fresh platform, latch 36 still in the released position (FIG. 27).

Telescoping arm 125 is extended as shown in FIG. 28 and having a fresh platform 124 thereon. The elevator frame is then raised to engage and receive this fresh platform and the telescoping arm is retracted (FIG. 29). It should be recognized that the latch 36 securing the platform to the elevator frame does not engage until the platform is lowered sufficiently, in reverse of the method by which the latch is opened.

Figure 30:
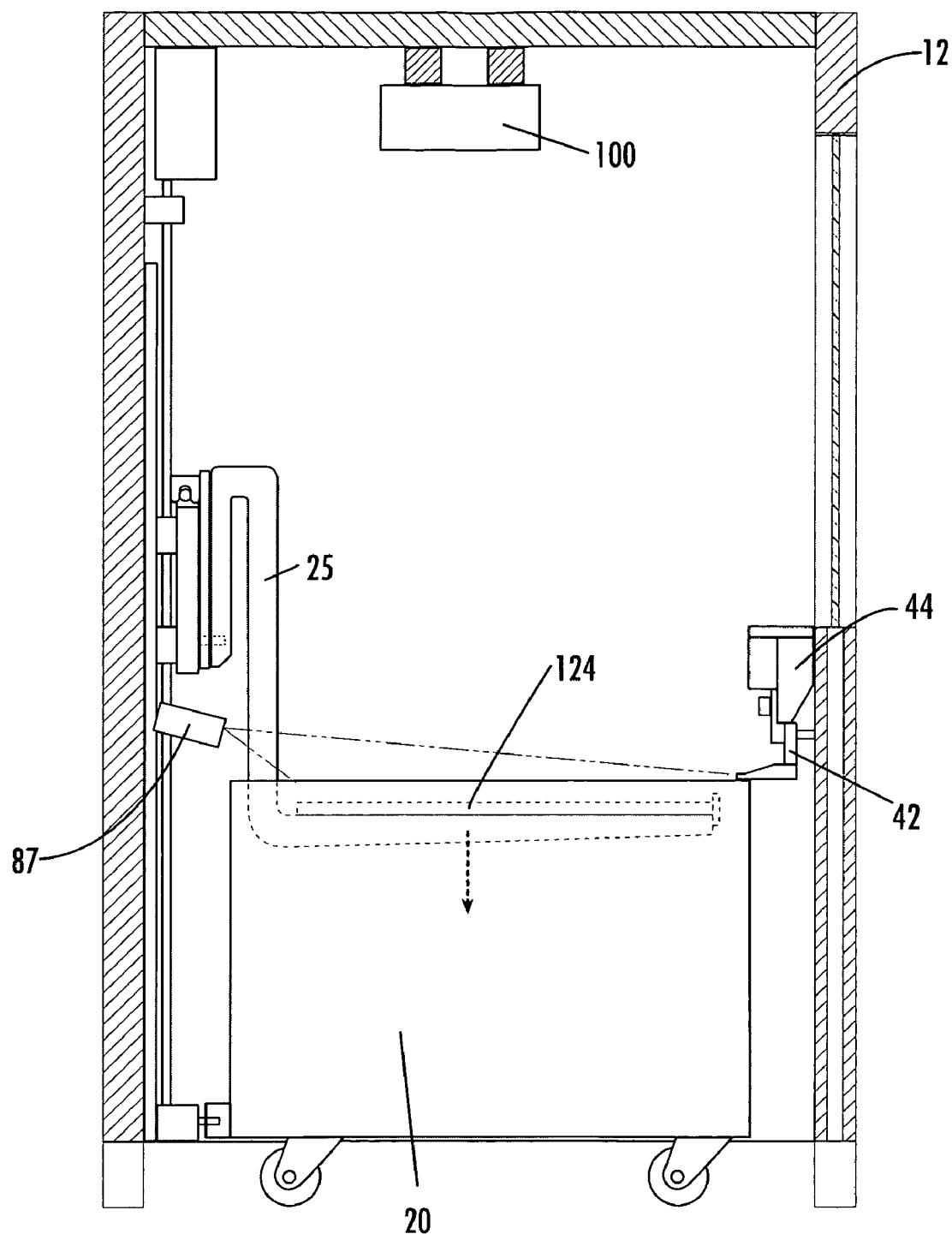
Figure 31:
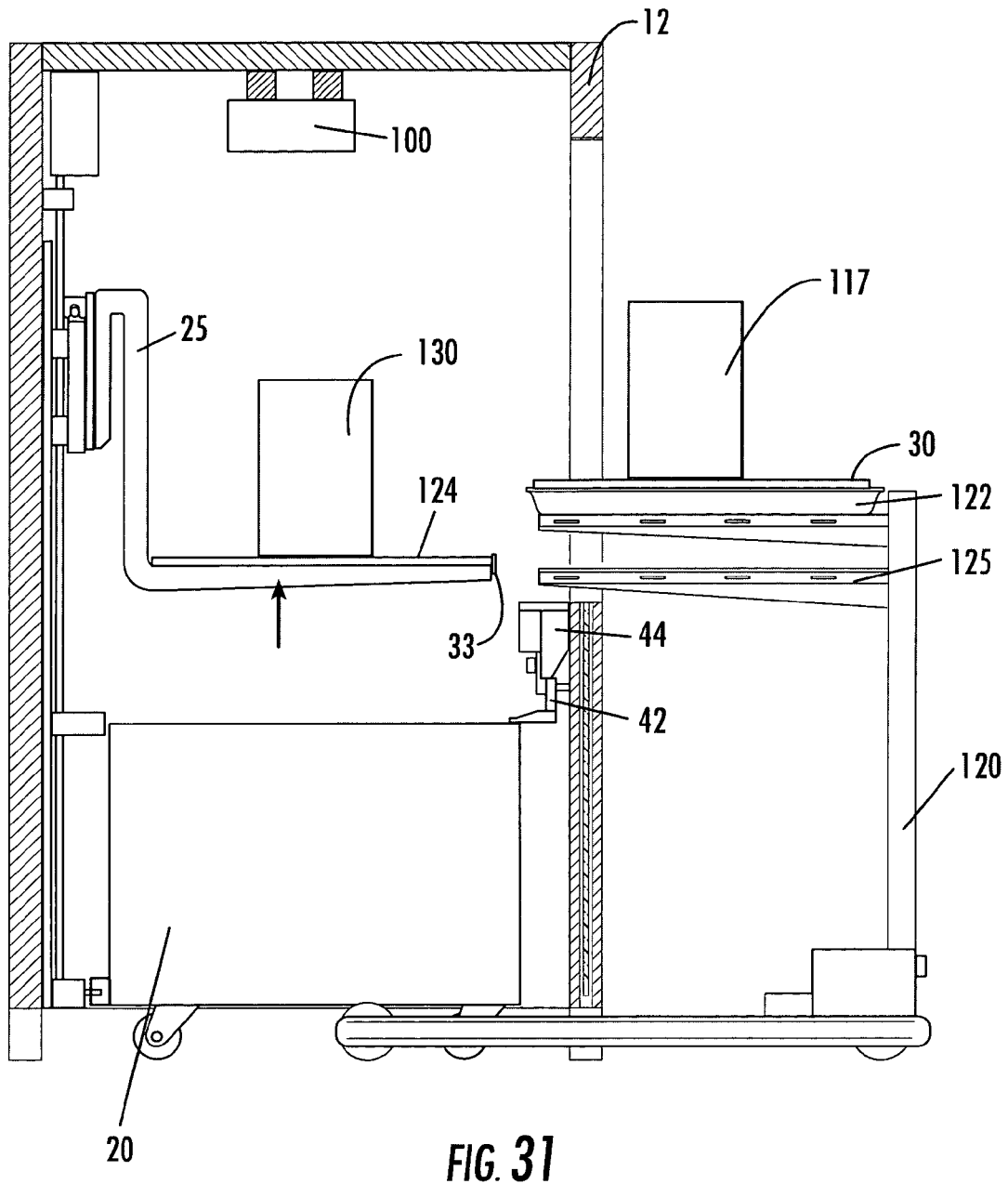

Once the fresh platform is in place and the latch secured, the elevator can lower the fresh platform into the vat of resin and below the resin surface for a determination, as discussed above, as to the amount of resin that is required to be added for the second build (FIG. 30). The second build is completed as the first, providing, as shown in FIG. 31, an offloaded first build object 117 and a second build object 130 elevated on its platform above the resin vat.

Having described the apparatus of the invention in some detail, and turning now to a consideration of the process steps, FIG. 33 shows a basic flow diagram for accomplishing an unattended build in a single vat according to the invention. In the unattended build mode, the apparatus builds a first three-dimensional object, removes the completed build object from the vat and elevator, and completes a second, unattended build. After the first build is removed, the apparatus installs a fresh platform on the elevator and adjusts the resin parameters as required, completes the second build, and removes the second build from the resin vat. It should be recognized that several objects can be built in a build simultaneously in a single vat or in adjacent vats and that FIG. 33 illustrates an unattended build of a single object in but one vat. Unattended builds can occur simultaneously in other vats in a multi-vat process.

At the process start, according to step 140 in FIG. 33, the human operator will have performed several functions. Having selected an unattended build mode, the operator will first need to input the object representation, typically using a CAD/CAM program for the object representation. The operator then determines the volume of resin required for the first build and whether the build volume is within the design limitations of the apparatus. For example, if the capacity of the apparatus includes building parts using up to 20 kilograms resin and no more, then if the object selected requires more, the operator will need to select a different build mode. If the design capacity provides for making a first and attended build, but not an unattended second build, then the unattended mode cannot be used.

The operator also verifies that a recoater blade is installed and is parked up and out of the way so as not to hit the resin vat when installed. Once the resin vat is installed, then the operator should verify that the vat is correctly installed and that the vat contains sufficient resin of the correct type. Normally, the vat will include an elevator subassembly, including an elevator attachment bracket, elevator supporting framework and forks, and a build platform secured by latch 36 and tabs 33 and 35 to the forks. The entire vat and elevator subassembly is rolled into the stereolithography chamber to engage the chamber elevator subassembly.

The relationship between the resin surface and the recoater blade can be mapped at this point or another point prior to the build and the data stored for use during the build. Once a particular resin is identified, the blade gap for the rein selected, and the level of the resin reproducibly controlled within the vat, then the map for these conditions should be useful for the same apparatus over a period of time.

In accordance with step 142, the operator installs the auto off-load cart having once satisfied the initial requirements and verified that an unattended build is supported. To install the auto off-load cart, the operator hingedly opens or removes the window on the chamber door so that the telescoping arms of the auto off-load cart can extend into the process chamber for retrieving the platform and first build. The operator docks the auto off-load cart into the vat with the chamber door closed. The chamber is heated and to avoid disturbances to the process, the chamber door is kept closed. Wheeled feet extend from the auto off-load cart into the chamber through a cutout in the bottom of the chamber door that is covered with brushes to minimize debris and heat losses. The vat and auto off-load cart are configured to maintain a consistent position when docked, one with respect to the other, for automated operation. The operator also makes sure the auto off-load cart is connected to the stereolithography system's computer for control of the automated operation.

Operators may change shifts at any point during preparation of the apparatus of the invention for the unattended build mode. Consequently, successful operation of the system often requires that the operators verify information about the system more than once. Thus, it is useful to have the computer control prompt the operator to verify before the first build starts that an empty platform is in fact in place on the auto off-load cart for installation when the first build is completed. Alternatively, verification that a platform is properly in place can be accomplished using appropriate sensors.

In accordance with step 144 the operator then causes the recoater assembly and elevator to go to the start positions. The elevator is lowered into the vat and is brought to a level just under the surface of the resin so as to define the working surface. The recoater assembly is lowered to the resin to define the preselected blade gap between the bottom of the foot and the working surface of the resin.

At this time, just prior to the actual start of the laser and recoater, it is useful to prompt the operator to verify the operating parameters. The operator should verify that a build platform is actually installed on the forks. If the build were to start without a platform in place, the results in lost productivity and resin could prove costly. If the platform is not in place on the elevator forks, then the operator should park the recoater, raise the elevator to the platform release position, and install a fresh platform. Once the presence of a platform is verified, then the resin and chamber temperatures should be checked. Typically, temperature control is a computer controlled function that is continuously performed. Nevertheless, it is useful for the operator to verify that the temperature is correct prior to initiating a build. The operator should also verify that the vat has sufficient resin. Even if the capacity of the system is adequate for the build, the system should be checked to verify that the vat contains the resin and that the resin level is between the preselected minimum and maximum levels in the tank necessary for fme level control of the build plane.

The operator should also verify, in accordance with step 148, that the supplemental resin containers contain sufficient resin for refilling the vat between builds and for fine level control during the builds. If not sufficient, then the operator should be prompted by the system, in accordance with step 149, to replace the partially full containers with full containers and to verify that the new containers contain the same resin as is in the vat. One efficient method of verifying the resins are the same is to run a radio frequency identification routine, or "RFID" routine. RFID tags can be included in the containers for automated identification prior to completing connection to the vat, after which the operator can complete installation if the resins are the same. The use of RFID tags on the containers and the vats permits data collection on the system's resin and resin usage to occur via data flow from the particular RFID reader on the elevator assembly for the vat and the individual RFID readers on the smart couplers on the vat for each container.

If the above parameters have been met, then the build can proceed. The operator should turn on the recoater vacuum in accordance with step 150 and adjust the resin level and resin and chamber temperatures as shown in steps 152 and 154 respectively. At this point, the resin level is within the preselected minimum and maximum levels and the level is adjusted within these levels to the precise level of the build plane that has been selected. Material is pumped into or removed from the vat by a metering pump interface with the two supplemental resin containers used for this purpose, and is automatically controlled in response to a sensor.

The recoater blade prepares the working surface to receive the laser and the actual stereolithography can now begin, in accordance with step 156, with preparation of the support layers. At this time, the operator's attendance to the process is no longer needed and the build proceeds based entirely on computer controlled functions. Typically, after each layer is solidified, the elevator will lower the platform to receive a fresh coating of resin and raise the platform sufficiently for lasing of the next layer. Resin level is adjusted as needed depending on the amount of shrinkage due to solidification and displacement by the platform and object below the surface of the resin. The recoater blade sweeps the surface between each layer to prepare the working surface and the build proceeds in accordance with step 158. Steps 156 and 158 may overlap.

Once the object is completed, the build is stopped, and the laser is turned off, then the system proceeds without an operator in attendance to exchange platforms. The system parks the recoater assembly in accordance with step 160 up and out of the way of the elevator forks so as to enable the elevator to move completely out of the resin vat with the build on the platform. The elevator is raised to the unload position in which the latch securing the elevator platform is released and the platform can be removed from the forks. The elevator forks, build platform, and build are now positioned over the vat and the unused resin still in contact with the forks, platform, and build object then drains into the vat in accordance with step 164. After a sufficient dwell time to provide an effective drain, the auto off-load cart removes the platform and completed and drained build object in accordance with step 166. Computer control extends a set of telescoping arms from the auto off-load cart underneath the elevator forks so that the forks can be lowered to deposit the platform and build on the telescoping arms of the auto off-load cart. A drain pan normally is desirable on the telescoping arms so that the platform and completed build object are deposited onto the drain pan on the telescoping arms. The telescoping arms retract to remove the platform and build object from elevator forks and the stereolithography chamber.

After the first build is removed from the chamber, the elevator moves the forks into position to receive a fresh platform in accordance with step 168. Telescoping arms again extend from the auto off-load platform. Depending on the configuration of the auto off-load cart, the cart may have one or two sets of telescoping arms. If two, then the first build object and platform remain in place outside the chamber. If one set, then the first build object again enters the chamber and the area above the vat and is positioned above the forks. The elevator forks are raised to engage and receive a fresh platform from the telescoping arms in accordance with step 170 and then the telescoping arms are removed, the first build object and platform to be stored with the auto off-load cart until the second build object is completed and the operator returns to the system.

Once the fresh platform is installed, the system returns to repeat several of the previous steps as shown in step 172. The elevator lowers the fresh platform into the resin, step 171, and brings the platform to the appropriate level. The system automatically and in response to sensors refills the vat and adjusts the resin levels and temperature and sweeps the working surface to prepare for the second build. The second build proceeds and, when completed, the recoater is parked and the elevator removes the second build and platform to an upper position out of the vat.

When the operator returns, the first and second builds are complete, the first build object is stored outside the chamber on the auto off-load cart, and the second build object is within the chamber, drained above the vat and ready to unload. It should be recognized that a single build is similar in the steps of building the object, and that the auto off-load cart may or may not be installed as desired. In either case, for a single build the system is directed to shut down after the first build. The system of FIG. 1 is a dual chamber system, and so two unattended builds can be performed using a single laser and separate scanners and auto off-load carts for each chamber to provide two builds outside the chamber, one on each cart, and two inside, one in each chamber.

Many modifications and other embodiments of the invention set forth herein will come to mind to one skilled in the art to which this invention pertains having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for stereolithography by which three-dimensional objects are produced from liquid resin by alternately applying laser energy to the uncured resin surface to at least partially cure the resin surface, recoating the at least partially cured resin surface with uncured resin, and repeating alternately applying energy and recoating to build the objects layer-by-layer in accordance with a predetermined object representation, said method comprising, prior to applying laser energy to the uncured resin surface, establishing a predetermined blade gap for a recoater and storing the predetermined blade gap in a controller, determining the distance between the bottom of the recoater and the resin surface at each end of the recoater at a plurality of points throughout the length of travel of the recoater and storing the determined distances in a controller, and during recoating, controlling the blade gap in response to the stored predetermined blade gap throughout the length of travel of the recoater and maintaining the recoater parallel to the resin surface throughout its length of travel at the predetermined blade gap.

2. A method according to claim 1 wherein the step of determining the distance between the bottom of the recoater and the resin surface at each end of the recoater at a plurality of points throughout the length of travel of the recoater comprises sensing the distance of a sensor from a first sensing location adjacent an end of the recoater to the resin surface, sensing the distance of the sensor from an adjacent second sensing location to a top surface of the recoater, determining the distance from the top surface to the bottom surface of the recoater, determining the distance between the bottom surface of the recoater and the surface of the resin, and repeating the sensing and determining steps at each end of the recoater at a plurality of points throughout the length of travel of the recoater.

3. A method according to claim 2 wherein the first and second sensing locations are immediately adjacent each other and wherein the top surface of the recoater is the top surface of a thinned down portion of a blade gap sensing foot extending laterally from the recoater at each end thereof and the bottom surface is the bottom of the foot.

4. A method for recoating a layer of at least partially cured resin in a stereolithography apparatus having a recoater, said method comprising the step of adjusting the height of each end of the recoater above the resin surface throughout the length of travel of the recoater at the predetermined blade gap, thereby to maintain the recoater parallel throughout its length of travel across the resin surface.

5. A method for keeping a recoater parallel with a resin surface in a stereolithography apparatus, said method comprising the step of rotating the recoater about a central axis thereof along the direction of travel of the recoater across the resin surface.

6. A method according to claim 1, wherein determining the distance between the bottom of the recoater and the resin surface comprises sensing a distance from a foot to the resin surface, wherein the foot extends from a surface of the recoater.

7. A method according to claim 1, wherein determining the distance between the bottom of the recoater and the resin surface comprises using at least one sensor to sense the distance between the bottom of the recoater and the resin surface at each end of the recoater.

8. A method according to claim 7, wherein the at least one sensor comprises a single sensor that translates along the length of the recoater such that a single sensor is used to determine the distance between the bottom of the recoater and the resin surface at each end of the recoater.

9. A method according to claim 1, wherein the recoater is selectively attached to a carrier and wherein the recoater is correctly oriented on the carrier with at least one alignment pin.

10. A method according to claim 1, wherein the recoater comprises a vacuum assisted recoater and includes a vacuum port for engaging a source of vacuum.

11. A method according to claim 4, wherein adjusting the height of each end of the recoater above the resin surface comprises sensing a distance from a foot to the resin surface, wherein the foot extends from a surface of the recoater.

12. A method according to claim 4, wherein adjusting the height of each end of the recoater above the resin surface comprises using at least one sensor to sense the distance between the bottom of the recoater and the resin surface at each end of the recoater.

13. A method according to claim 12, wherein the at least one sensor comprises a single sensor that translates along a length of the recoater such that a single sensor is used to determine the distance between the bottom of the recoater and the resin surface at each end of the recoater.

14. A method according to claim 4, wherein the recoater is selectively attached to a carrier and wherein the recoater is correctly oriented on the carrier with at least one alignment pin.

15. A method according to claim 4, wherein the recoater comprises a vacuum assisted recoater and includes a vacuum port for engaging a source of vacuum.

16. A method according to claim 5 further comprising sensing a distance from a foot to the resin surface, wherein the foot extends from a surface of the recoater.

17. A method according to claim 5 further comprising using at least one sensor to sense a distance between the bottom of the recoater and the resin surface at each end of the recoater.

18. A method according to claim 17, wherein the at least one sensor comprises a single sensor that translates along a length of the recoater such that a single sensor is used to determine the distance between the bottom of the recoater and the resin surface at each end of the recoater.

19. A method according to claim 5, wherein the recoater is selectively attached to a carrier and wherein the recoater is correctly oriented on the carrier with at least one alignment pin.

20. A method according to claim 5, wherein the recoater comprises a vacuum assisted recoater and includes a vacuum port for engaging a source of vacuum.

* * * * *